US012739483B2

(12) United States Patent
Spaas et al.

(10) Patent No.: US 12,739,483 B2
(45) Date of Patent: Sep. 15, 2026

(54) HEAD MOUNTED DISPLAY DEVICE AND SYSTEM

(71) Applicant: ARSpectra S.à.r.l, Foetz (LU)

(72) Inventors: Cedric Spaas, Foetz (LU); Augusto Wladimir De La Cadena, Foetz (LU)

(73) Assignee: ARSpectra S.à.r.l, Foetz (LU)

( * ) Notice: Subject to any disclaimer, the term of this patent is extended or adjusted under 35 U.S.C. 154(b) by 0 days.

(21) Appl. No.: 18/543,732

(22) Filed: Dec. 18, 2023

(65) Prior Publication Data

US 2024/0205522 A1 Jun. 20, 2024

(30) Foreign Application Priority Data

Dec. 19, 2022 (LU) .................................. LU503212

(51) Int. Cl.

| | |
|---|---|
| ***H04N 23/45*** | (2023.01) |
| ***G02B 27/01*** | (2006.01) |
| ***H04N 5/262*** | (2006.01) |
| ***H04N 23/13*** | (2023.01) |

(52) U.S. Cl.

CPC ......... *H04N 23/45* (2023.01); *G02B 27/0172* (2013.01); *H04N 5/2628* (2013.01); *H04N 23/13* (2023.01)

(58) Field of Classification Search

CPC ........ G02B 27/0172; G02B 2027/0138; G02B 2027/014; G02B 2027/0178; A61B 5/0002; H04N 23/13; H04N 23/45; H04N 23/2628; H04N 7/183; H04N 5/2628

See application file for complete search history.

(56) References Cited

U.S. PATENT DOCUMENTS

| | | | | |
|---|---|---|---|---|
| 8,872,910 B1 | 10/2014 | Vaziri | | |
| 11,463,674 B1 | 10/2022 | Ollila | | |
| 2015/0244903 A1* | 8/2015 | Adams | G02B 27/0172 348/376 | |
| 2017/0280066 A1* | 9/2017 | Hayashi | H04N 25/42 | |
| 2017/0324899 A1* | 11/2017 | Ohba | H04N 5/265 | |
| 2020/0012106 A1 | 1/2020 | Shpunt | | |
| 2020/0386982 A1* | 12/2020 | Luxembourg | A61B 6/466 | |

(Continued)

FOREIGN PATENT DOCUMENTS

| | | |
|---|---|---|
| WO | 2021032828 A1 | 2/2021 |
| WO | 2021089440 A1 | 5/2021 |

*Primary Examiner* — Xuemei Zheng

(74) *Attorney, Agent, or Firm* — Dennemeyer & Associates LLC

(57) ABSTRACT

A bifocal head mounted display device, a system for distributing bifocal image data in a network and a corresponding method are disclosed. The HMD device comprises first and second imaging sensors with respective focus values defining respective fields of view, wherein the focus values are different and wherein one field of view is contained within the other. The HMD device further comprises display means, data processing means and a data output interface operable to interface the HMD device with one or more remote terminal. The first and second imaging sensors capture respective image data in realtime, and at least the second image data is output to a user interface displayed on the HMD display means. Captured first and/or second image data is selectively distributed to the one or more remote terminals with the data output interface, and output locally to respective user interfaces.

19 Claims, 14 Drawing Sheets

(56) References Cited

U.S. PATENT DOCUMENTS

2021/0382559 A1 12/2021 Segev
2022/0197033 A1* 6/2022 Liang .................. H04N 13/243
2024/0385456 A1* 11/2024 Yamazaki ............. G02B 27/02

* cited by examiner

20[10B]
26A
24
26B
72
401-404
>405>408>407
24[10B]
708
[612]
74
606
[610]

20[10A]
24A
26A
[36]
22
24B
26B
401-404
>405>406>407
606
[612]
74
[36]
22
606
[612]

<...>
output frame(s) to UI
1211
UI FoV translation?
1411
no
yes
on selection: get curr FoV UI coords
*(e.g. P[n,n] = {val1, val2, val3, val4}*
1412
on translation end: compute translation factor
*(e.g.T[ ]={val4,val5})*
1413
send network request to HMD
[next] FoV selection (transl.factor)
1414
close?
no
yes
110
(1304)

HEAD MOUNTED DISPLAY DEVICE AND SYSTEM

This application claims priority to Luxembourg Patent Application No. LU503212, filed on Dec. 19, 2022, the disclosure of which is incorporated herein by reference.

FIELD OF INVENTION

The invention belongs to the field of head mounted display ('HMD') devices.

BACKGROUND TO INVENTION

Head mounted display ('HMD') devices are digital display devices with some on-board data processing capacity, which project digital video content in a user's direct field of view, either in superposition to the user's real physical environment in the case of see-through augmented reality ('AR') glasses, or as computer-generated imagery in replacement of that real physical environment in the case of virtual reality ('VR') headsets or still, lately, as a combination of captured physical environment and computer-generated imagery in the case of mixed reality ('MR') headsets.

Software processed by such HMDs, or by external data processing modules operably connected thereto, provides significant ergonomic and productivity advantages in visualization, remote assistance, training and navigation for their wearers. Application cases and technical developments in the field of computer-aided vision have accordingly grown particularly fast in recent times, rapidly increasing the complexity of hardware and software components in such devices and, reciprocally, the combined power draw of physical components and the data storage requirements for image data to be processed and displayed.

In that context, at least AR glasses and MR headsets are known to include imaging sensors, historically at least one optical sensor with a large field of view for capturing the real physical environment ambient the wearer and, increasingly now, further optical sensors optionally configured with a variable focus mechanism to implement zooming. One such example is disclosed in WO2021/032828 A1. Various HMDs are also known to include additional sensors beside cameras, for example time-of-flight (ToF) sensors to aid in distance measurement of objects in the HMD field of view relative to the HMD, for instance to determine their position and/or orientation in the HMD's cartesian reference system. One such example is disclosed in WO2021/089440 A1 of the Applicant.

Yet in various medical and industrial circumstances requiring bifocal vision, such as surgeons' loupes used in delicate surgery procedures and also used by computing technicians in e.g. printed circuit board-level maintenance of computing hardware, none of these increasingly-complex HMD devices implements a bifocal vision technique. The HMD optical sensor with a focusing capacity is alternatively zoomed to the area of discrete interest, or reset to the wide field of view over time, according to whether the HMD wearer requires the broader or the focused perspective whilst performing their tasks.

In situations wherein the optical sensor data is shared with other users, typically for observation and feedback substantially in realtime, for example with a medical colleague at a terminal remote from the HMD wearer, this alternating between broader or focused perspectives at the initiative of the HMD wearer is disruptive to the observation task and, where the remote observer requests the perspective alternating from the HMD wearer, disruptive to the task performance itself.

Accordingly, there is a requirement for a solution implementing a computationally-inexpensive, but simultaneous, capture and distribution of nested fields of view in the physical environment ambient the HMD wearer.

SUMMARY OF INVENTION

Aspects of the invention are set out in the accompanying claims, respectively aimed at various embodiments of a head mounted display (HMD) device, various embodiments of a bifocal distributed imaging system based on the head mounted display (HMD) device, and various embodiments of a method of distributing image data in a network with the system.

In a first aspect, the present invention provides a head mounted display (HMD) device comprising at least first and second imaging sensors, wherein the first imaging sensor is configured with a first focal value defining a first field of view for capturing first image data in realtime, wherein the second imaging sensor is configured with a second focal value defining a second field of view, for capturing second image data in realtime, and wherein the first and second focal values are different and wherein the second field of view is contained within the first field of view; display means; and data processing means operably connected to the display means and to the first and second imaging sensors, configured to output a user interface on the display means and to output at least the captured second image data in the user interface.

The second field of view advantageously provides a more focused view of a portion of the physical environment ambient the HMD in the first field of view, wherein the first and second imaging sensors, for instance optical sensors, capture both views concurrently, in a common perspective relative to the HMD orientation. The use of two optical sensors arranged with nested fields of view as described herein, advantageously dispenses with the computational expense of correcting image data for alignment and parallax effects, and with the complexity and power requirements of focusable cameras with motorised components. At least the second, more focused view is output, because the wearer of AR glasses does not require the broader perspective provided by the first optical sensor to be displayed, since the ambient physical environment being observable through the clear lens portion of the AN HMD.

In alternative embodiments of the HMD device, particularly VR and MR headsets, the data processing means is preferably configured to selectively output the first and/or second image data in the user interface according to a selection of the HMD wearer. This feature advantageously allows the user to select the perspective most useful at any particular point in time, with the combination of first and second image data deemed most useful since it helps the user maintain situational awareness and desired HMD orientation within the ambient physical environment, and concurrently observe the portion of highest interest within the more focused field of view.

Accordingly, in embodiments of the HMD device wherein the data processing means is configured to output both the first and second image data in the user interface, the data processing is preferably further configured to composite the first image data with the second image data, for instance following a picture-in-picture display technique wherein a large portion of the total display area in the user interface is assigned to display the first image data and a small portion of the total display area is assigned to display the second image, or reciprocally.

In variants of such embodiments, a ratio of the first image data to the second image data in the user interface is adjustable by a wearer of the HMD device, so as to modify the portions of the total display area in the user interface respectively assigned to the first and second image data according to circumstances and ergonomic needs. For example, a surgeon performing an operation in very close proximity to a patient, may require only a very small portion of the user interface dedicated to the first image data representative of the ambient physical environment, relative to the more focused view provided by the second image data.

Embodiments of the HMD device may further comprise an image processing module operably connected to the second optical sensor and the data processing means, wherein the second optical sensor is configured with the second focal value by programming the image processing module to receive second image data from the second optical sensor and crop the second image data to an image portion representative of the second field of view. This configuration advantageously reduces memory storage requirements for the HMD, since device drivers, configuration and other parameters are common to both imaging sensors, and also reduced sensor type inventory requirements for the HMD assembler, whilst releasing CPU capacity. Subject to the type of image processing module and its power draw, particularly in the case of a FPGA unit, the corresponding image data processing activity offloaded from the HMD CPU can even reduce the overall power consumption of the HMD components.

The physical configuration of optical sensors on the HMD device may vary greatly according to materials, desired unit weight, component type and more. Generally, embodiments of the HMD device may include first and second optical sensors located adjacent one another, centrally of a front aspect of the HMD device, in order to minimise the difference in optical perspective between the two units. Variants may include locating the first and second optical sensors in alignment, either side by side or one above the other. The second optical sensor may also be actuatable, for example configured with pan and tilt capacities, and the data processing means configured to translate the second field of view within the first field of view in use.

The HMD device may further comprise an image signal processing module, which relieves central data processing unit(s) of the HMD from operations on images captured by the sensors, such as de-mosaicing, de-noising and assorted other functions enhancing the image data, all before it is processed for output to the user interface according to the principles described herein. In a particularly power efficient variant, the image signal processing module may be implemented with a field-programmable gate array ('FPGA'), interfacing the second optical sensor with other data processing modules and components of the HMD, and programmed to crop each image frame captured by the second sensor.

In certain embodiments of the HMD, the first and second optical sensors may capture visible light, typically in a wavelength range of 400 to 700 nm. In alternative embodiments, at least one sensor may capture light within a different spectrum relative to the other, for example in the wavelength range 800 to 2,500 nm corresponding to near infrared ('NIR') light.

Embodiments of the HMD device may further comprise data networking means, wherein the data processing means is further configured to selectively distribute the first and/or second image data to at least one remote terminal with the data networking means. This configuration is particularly useful when the HMD wearer engages in tasks or procedures apt to benefit from peer feedback and/or assistance, and/or for purposes of training a remote audience eventually called to perform the same tasks or procedures, equipped with remote terminals.

In variants of such networkable embodiments, the data processing means may be further configured to receive remote selections and to selectively distribute the first and/or second image data according to a respective user selection at the or each remote terminal. This configuration advantageously allows users of remote terminals network-connected with the HMD, to selectively display the first and/or second image data locally according to their own observational or operational requirements ad hoc, without disturbing the HMD wearer during the performance of tasks or procedures.

Suitably, the HMD device may be embodied as augmented reality glasses, wherein the second image data, more focused than the first, is of most use in a display portion of the see-through glasses as the wearer observes the ambient physical environment through the same or a still-wider field of view as the first image data; and as a virtual reality headset or a mixed reality headset, wherein the first and/or second image data may be displayed on video display capacity available therein, and wherein the second image data overlaid as a portion of the display capacity dedicated to the first image data, or reciprocally should be a user interface configuration of most use.

In another aspect, the present invention provides a bifocal distributed imaging system, comprising at least one head mounted display (HMD) device as described above and inclusive of data networking means operable to interface the HMD device with a network, wherein the data processing means is also configured to distribute the captured image data to at least one remote terminal across the network, and one or more remote terminal addressable by the data networking means across the network, each having a display and configured to output the distributed image data to a second user interface displayed on a display thereof. This system advantageously helps realise the operational advantages associated with embodiments of the HMD including data networking means, previously introduced.

In embodiments of the system, the data processing means may be further configured to receive a local user input, representative of a local selection of the first and/or second image data, and to selectively output the first and/or second image data in the first user interface according to the selection. In variants of such embodiments, particularly suited for HMDs with a hardware configuration fully occluding the ambient physical environment from the user's natural vision, the data processing means of the HMD may be further configured to composite the first image data with the second image data in the first user interface, when local user input is representative of a selection of the first and second image data.

The local user input may be a predefined user gesture captured optically by the first or second imaging sensors in use, or a predefined haptic interrupt captured by a haptic sensor of the HMD or of an accessory thereof likewise in use, to minimise the user interaction time and requirements for effecting the selection.

In embodiments of the system, the data processing means may be further configured to receive a remote user input, representative of a selection of the first and/or second image data at the remote terminal, and to selectively distribute the first and/or second image data according to the remote selection, independently of the image data output to the first user interface at the HMD device. In variants of such embodiments, the remote terminal may be further configured to composite the first image data with the second image data in the second user interface, when remote user input is representative of a selection of the first and second image data. These embodiments all advantageously help realise the operational advantages associated with embodiments of the HMD including data networking means, wherein remote terminal users can select first and/or second image data independently of the HMD and its wearer, previously introduced.

In variants of image-compositing embodiments, the system may advantageously allow the user to adjust a ratio of the first image data to the second image data in the user interface, according to their situational and/or operational preferences. In the context of the system according to the invention, such variants advantageously extend to users of remote terminals, whose observational preferences may differ from the situational and/or operational preferences of the HMD wearer performing tasks and procedures, wherein adjustment of the terminal user interface is independent of the HMD user interface configuration.

In a further aspect, the present invention provides a method of distributing image data in a network, comprising steps of providing at least one head mounted display (HMD) device inclusive of data networking means as described above and herein, interfacing the at least one HMD device with at least one remote data processing terminal across a network with the data networking means, capturing first image data with the first imaging sensor and second image data with the second imaging sensor in realtime, outputting at least the second image data to a first user interface displayed on the display means, distributing first and/or second image data to the or each remote terminal, and outputting the distributed image data to a second user interface displayed on a display of the or each remote terminal.

Embodiments of the method may comprise the further steps of receiving a local user input at the HMD device, representative of a local selection of the first and/or second image data, and outputting the first and/or second image data in the first user interface according to the selection.

Embodiments of the method may also or alternatively comprise the further steps of receiving a remote user input at the HMD device, representative of a remote selection of the first and/or second image data, and distributing the first and/or second image data according to the remote selection, independently of the image data output to the first user interface at the HMD device.

In variants of the above embodiments wherein the local and/or remote selection is for both the first and the second image data, the method preferably comprises a further step of compositing the first image data with the second image data, for a combined output in the user interface. The ratio of the first image data to the second image data is preferably adjustable in the first user interface at the HMD device and in the second user interface at each remote terminal, each independently of the others, to maximise user convenience and ergonomy.

In embodiments of the HMD device, of the bifocal distributed imaging system and of the image data-distributing method, the first field of view may be substantially 65 degrees or more and the second field of view may be substantially 40 degrees or less. A combination of a first field of view of substantially 70 degrees with a second field of view of substantially 25 degrees is considered particularly suitable for precision tasks and procedures, for example surgery.

Other aspects of the invention are set out in the accompanying claims.

BRIEF DESCRIPTION OF DRAWINGS

The invention will be more clearly understood from the following description of an embodiment thereof, given by way of example only, with reference to the accompanying drawings, in which:—

DETAILED DESCRIPTION OF DRAWINGS

Figure 1A:
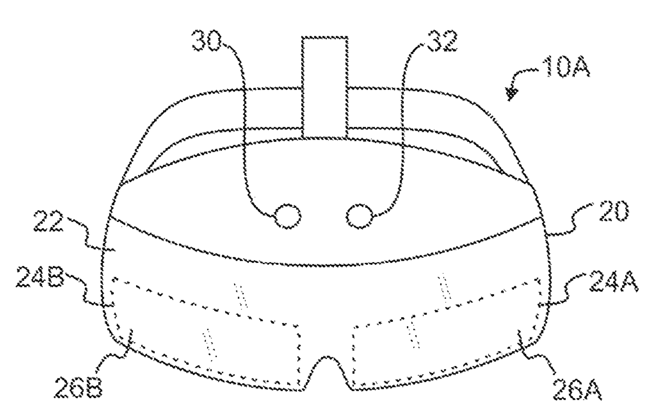
FIGS. 1A, 1B, 1C and 1D show respective embodiments of a head mounted display (HMD) device according to the invention, with at least two optical sensors implementing nested fields of view.

There will now be described by way of example specific modes contemplated by the inventor. In the following description and accompanying figures, numerous specific details are set forth in order to provide a thorough understanding, wherein like reference numerals designate like features. It will be readily apparent to one skilled in the art, that the present invention may be practiced without limitation to these specific details. In other instances, well known methods and structures have not been described in detail, to avoid obscuring the description unnecessarily.

The inventive concept involves a head mounted display ('HMD') device 10, several embodiments of which are illustrated in FIGS. 1A to 1D, wherein like numerals reference like features. The HMD is preferably of the augmented reality ('AR') type 10A shown in FIG. 1A, wherein the HMD comprises a wearer visor 20, which includes a main see-though portion 22 and eye-respective video display portions 24A, 24B located equidistantly of a central bridge portion overlying a wearer's nose in use. The display portions 24A, 24B implement, perceptually, a single video display occupying a subset of the front aspect of the HMD, wherein the wearer can observe both the ambient physical environment and the display. Alternative embodiments consider display portions 24A, 24B maintaining perceptually-distinct video displays, still occupying a subset of the front aspect of the HMD, wherein the wearer can observe the ambient physical environment and, selectively, display-respective image data in the first and/or second display.

Each video display portion 24A, 24B each consist of a respective video display unit 26A, 26B, in the example a micro OLED panel with a minimum 60 Hz frame refresh rate and a resolution of 1920×1080 pixels, located proximate a lower edge of the visor so as to leave the see-though portion 22 extending above it up to its upper edge, clear of visual occlusion when the VDUs are displaying.

Figure 1B:
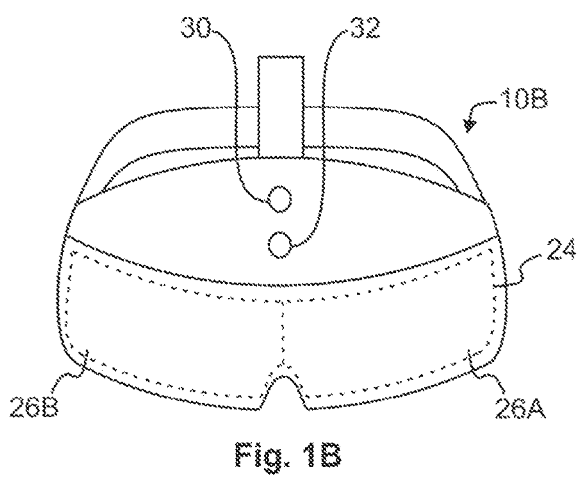

The technical principle may implemented in other HMD types, such as a virtual reality ('VR') or mixed reality ('MR') closed display device 10B shown in FIG. 1B, wherein the eye-respective video display portions 24A, 24B implement, perceptually, a single video display portion 24 occupying substantially the whole inner front aspect of the HMD. For such HMDs, each video display portion 24A, 24B may consist of a RGB low persistence panel 26A, 26B with a minimum 60 Hz frame refresh rate and an individual resolution of 2448×2448 pixels per eye, for a perceived single video display with a resolution of 4896×2448 pixels.

An HMD of the invention further comprises at least first and second imaging sensors 30, 32, e.g. a pair of optical sensors, located adjacent one another in order to minimise the difference in optical perspective between the two units, substantially centrally of a front aspect of the HMD. The first and second optical sensors 30, 32 capture visible light in a typical wavelength range of 400 to 700 nm. In alternative embodiments advantageous to surgical uses, at least the second optical sensor 32 captures light within a different spectrum relative to the first sensor 30, for example in the wavelength range 800 to 2,500 nm corresponding to near infrared ('NIR') light, whereby the wearer may observe aspects of a subject made fluorescent by a NIR imaging contrast agent.

Figure 1C:
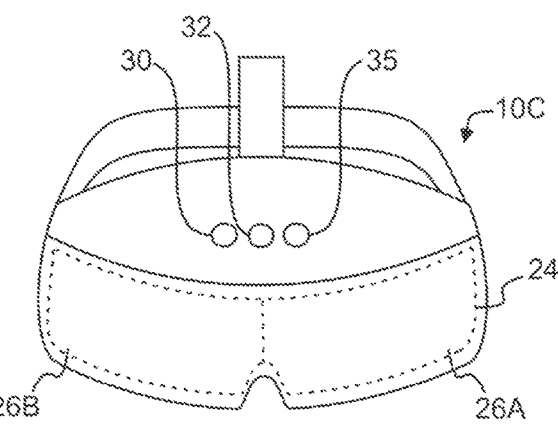
Figure 1D:
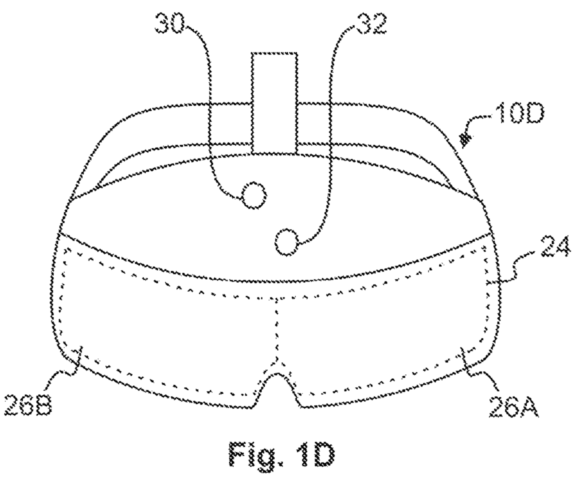

The first and second optical sensors can be located at the level of a wearer's forehead, either side by side as shown in the AR HMD embodiment 10A, or one above the other as shown in the VR/MR HMD embodiment 10B or, when the second imaging sensor 32 is actuatable, for instance with pan and tilt capacities, offset one relative to the other as shown in the VR/MR HMD embodiment 10D shown in FIG. 1D. Still other configurations may be practiced, for example with locating the optical sensors at the level of a wearer's eyes on VR/MR HMDs.

Embodiments of the HMD may include further sensors, for example a further optical sensor 35 as shown in the HMD embodiment 10C shown in FIG. 1C, identical to the first sensor 30 for providing a stereoscopic capture of the ambient physical environment with depth information. In HMD embodiments with first and second imaging sensors 30, 32 capturing visible light, and particularly wherein the display portions 24A, 24B maintain perceptually-distinct video displays in use, the further optical sensor 35 may instead capture light within a different spectrum relative to the first and second sensors, for example again in the wavelength range 800 to 2,500 nm corresponding to near infrared ('NIR') light.

Figures 2, 3A:
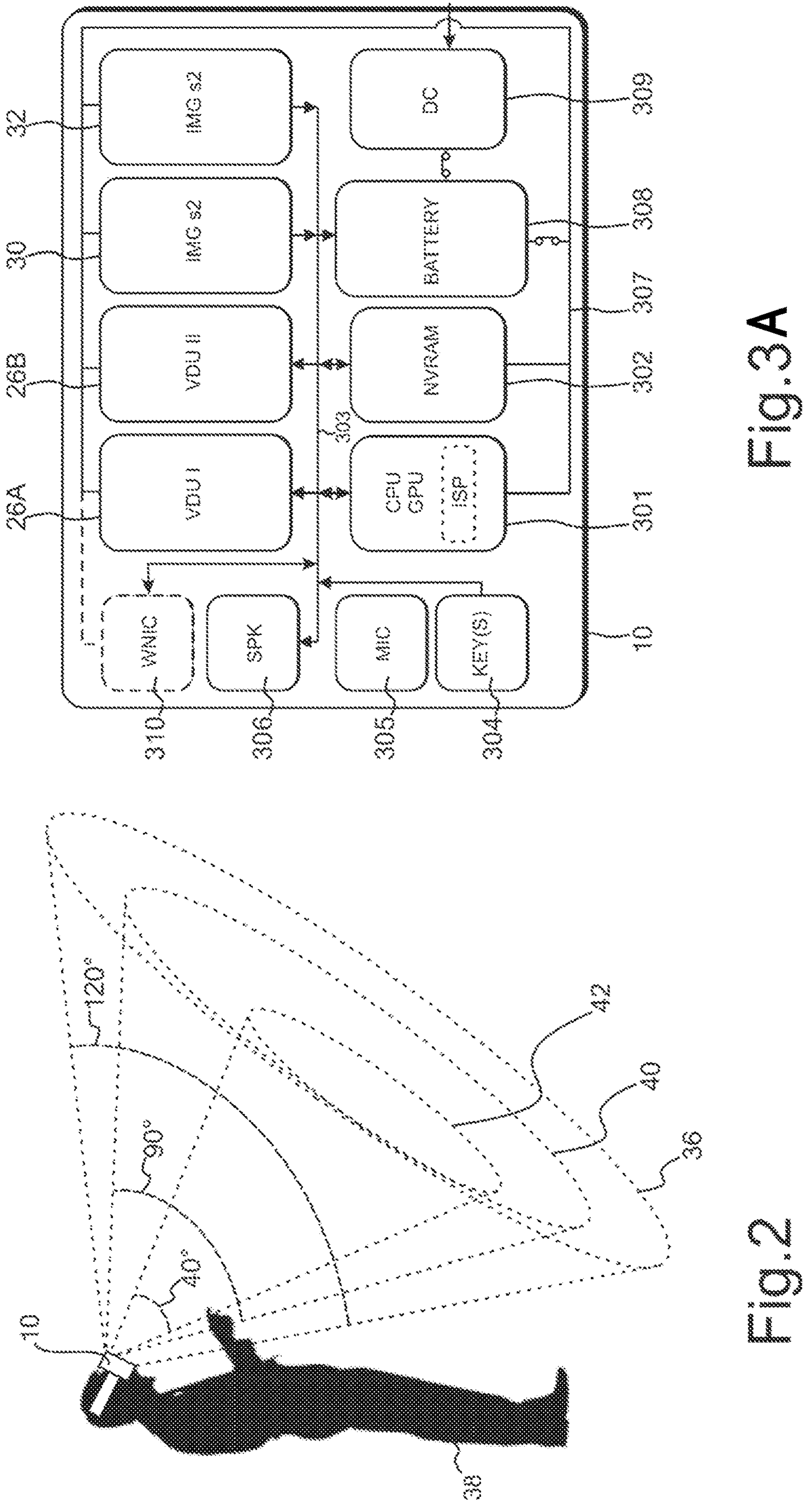
FIG. 2 shows a user wearing a HMD of any of FIGS. 1A to 1D and illustrates the nested fields of view in use.
FIGS. 3A, 3B and 3C are example hardware architectures of respective embodiments of a HMD shown in any of FIGS. 1A to 1D and FIG. 2, including a memory.

With reference to FIG. 2, relative to the natural field of vision 36 of a human HMD wearer 38, habitually estimated at approximately 120°, the first optical sensor 30 has a first focal value defining a first ambient field of view 40, in the range 65° to 90° or more. The second optical sensor 32 has a second focal value different from the first focal value, which defines a second focused field of view 42 narrower relative to the first field of view, of substantially 40° or less.

The first and second optical sensors 30, 32 are mounted to the HMD 10 with their respective apertures oriented to contain, or nest, the focused field of view 42 within the ambient field of view 40, thus wherein a portion of the ambient physical environment imaged by the first optical sensor 30 is simultaneously imaged by the second optical sensor 32 and, under the narrower focal value thereof, effectively magnified. In embodiments wherein the second optical sensor 32 comprises pan and tilt capacities, the respective pan and tilt courses are preferably constrained to likewise contain the second focused field of view 42 within the first ambient field of view 40 irrespective of user commands in use, for example in software through setting course limit values for the component pan/tilt mechanism in the HMD configuration, e.g. in its firmware or operating system.

An HMD 10 of the invention further comprises a data processing capacity and, optionally, a data connectivity unit to facilitate remote user observation. Example hardware architectures for a HMD 10 of the invention are next described in further detail with reference to FIGS. 3A, 3B and 3C, wherein like numerals reference like features, by way of non-limitative example. The HMD 10 firstly includes a data processing unit 301, which is a general-purpose microprocessor, for instance conforming to the Cortex™ architecture manufactured by ARM™, acting as the main controller of the HMD and which is coupled with memory means 302, comprising volatile random-access memory (RAM), non-volatile random-access memory (NVRAM) or a combination thereof.

With reference to FIG. 3A, the CPU 301 may include a dedicated image signal processing (ISP) unit or module to receive and pre-process both the standard and focused views 40, 42 of the scene respectively imaged by the optical sensors 30, 32 before outputting the corresponding image data to the CPU 301. When present, this ISP unit is either integral or coexists with the CPU 301, that is programmed to perform other data processing tasks described hereafter.

Figures 3B, 3C:
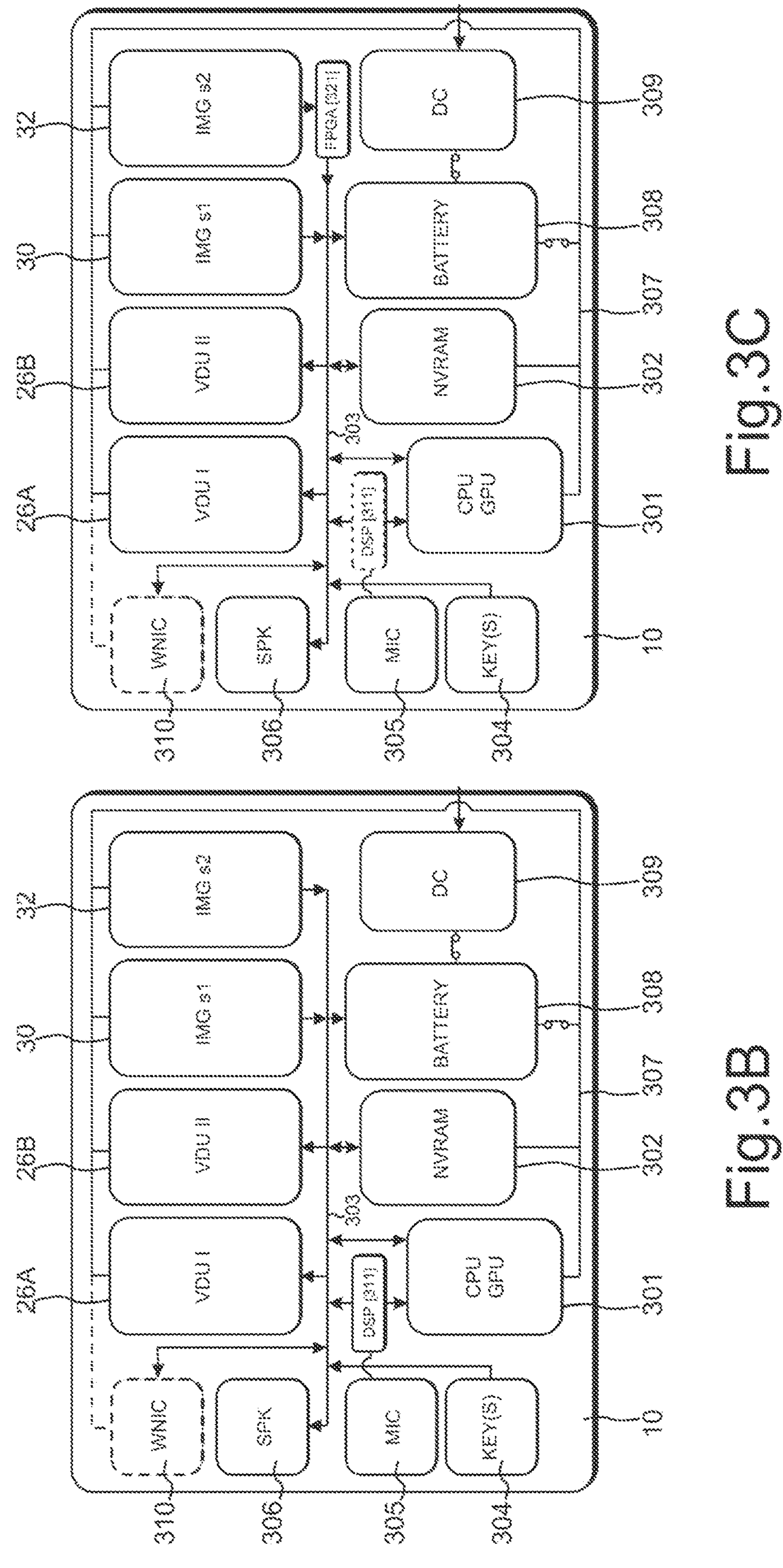

Alternative embodiments of the HMD architecture are proposed, that are designed to minimise image processing tasks for the CPU 301, particularly when same does not include an ISP unit or module, or the like. With reference to FIG. 3B, the architecture may also, or instead, comprise a Digital Signal Processor ('DSP') 311 interfacing the CPU 301 with other components in the architecture, in particular components capturing analogue signals, capable of programming to pre-process each image frame captured by an image sensor 30, 32 before it is output to the CPU 301. With reference to FIG. 3C, the architecture may also, or instead, comprise a dedicated low-power single-purpose module, for example a FPGA unit 321, interfacing the second image sensor 32 with other components in the architecture, and which is programmed to crop each image frame captured by the sensor 32 before it is output to the CPU 301.

The architecture also includes the first and second optical sensors 30, 32. In some embodiments, the first optical sensor 30 is configured with a field of view of substantially 65 degrees or more and the second optical sensor 32 is configured a field of view of substantially 40 degrees or less, wherein the optical zoom effect provided by the second, focused field of view advantageously relieves the architecture, in particular the CPU 301 when unaided by an optional DSP 311 and/or FPGA 321, from the data processing burden associated with cropping, masking, interpolating and filtering a full-scene frame captured by the first optical sensor 30, which would otherwise be required to provide substantially the same output as the second optical sensor. A second optical sensor 32 with a fixed aperture and a narrower field of view relative to the first sensor 30 also dispenses with the weight, power draw and costs of components associated with conferring an optical zooming to the first optical sensor, or another.

In other embodiments wherein the architecture comprises an FPGA 321, the first and second optical sensors 30 32 may be substantially identical, wherein the configuration of the FPGA 321 to crop each image frame produced by the second image sensor 32 according to dimensions corresponding to the second focused field of view, provides the CPU 301 with pre-processed second image data embodying a similar optical zoom effect.

The CPU 301 and/or optional ISP and/or DSP 311 and/or FPGA 321 and the memory 302 are connected by a data input/output bus 303, over which they communicate and to which further components of the HMD 10 are similarly connected, in order to provide headset functionality and receive user commands. Image data is captured by the first and second optical sensors 30, 32 and user input data may be received from a physical input interface 304, which for the HMD may be one or more buttons, including at least an on/off switch, and/or a portion of the HMD body configured responsive to user touch for haptic capture. In the particular field of HMDs, skilled persons will be readily aware that user input data, inclusive of commands, can be further implemented as user indirect input, consisting of one or more gestures captured optically by at least one optical sensor 30, 32 and interpreted by the HMD, and/or consisting of spoken words, captured as analogue sound wave data by a microphone 305, for which the DSP 311 implements an analogue-to-digital converting function.

Processed data is primarily video data output through the bus 303 as display data to the display units 26A, 26B and processed audio data is output to a speaker unit 306. Power is supplied to the above components by an electrical circuit 307, which is interfaced with an internal battery module 308, wherein the battery is periodically recharged by an electrical converter 309.

Embodiments of the HMD 10 may further include networking means 310, shown in dotted line in the figure as a wireless network interface card or module (WNIC) also connected to the data input/output bus 303 and electrical circuit 307, and apt to interface the HMD with a wireless local area network ('WLAN') generated by a local wireless router, all described hereafter by reference to a system of the invention. Alternative or additional wireless data communication functionality may be provided by the same or another module, for example implementing a short-range data communication according to the Bluetooth™ and/or Near Field Communication (NFC) interoperability and data communication protocol.

Figure 4:
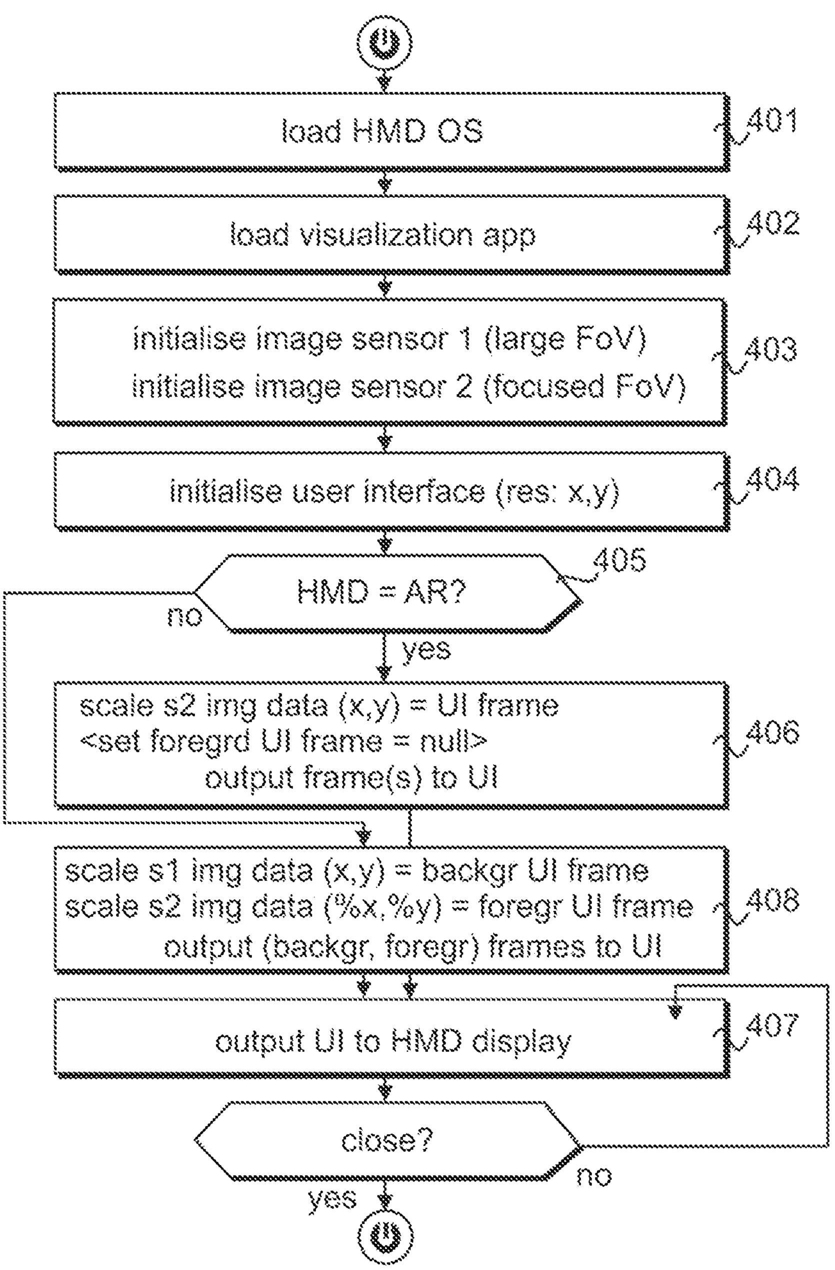
FIG. 4 details data processing steps performed by the architecture of any of FIGS. 3A to 3C.
Figure 5:
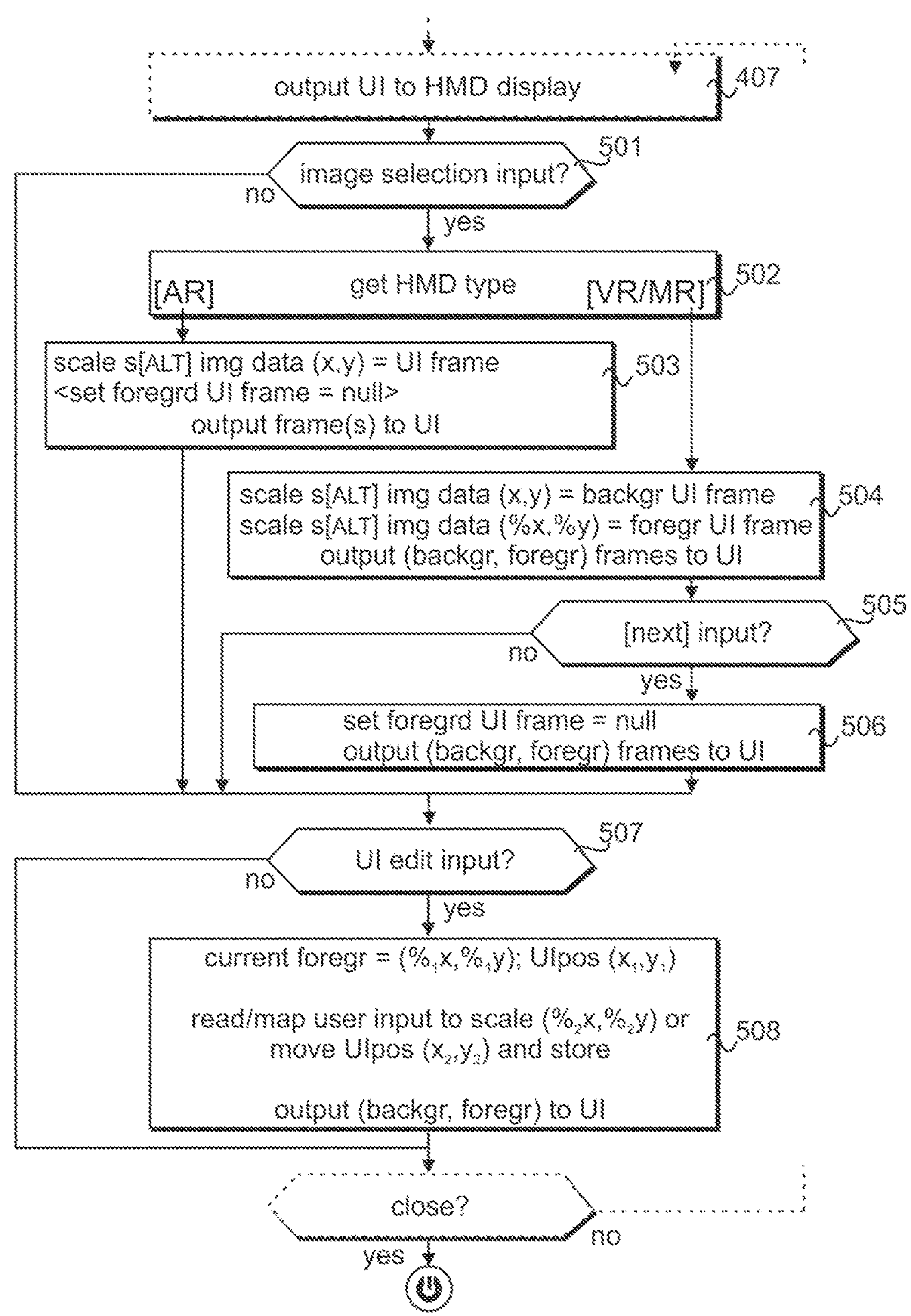
FIG. 5 details data processing steps optionally performed by the architecture of any of FIGS. 3A to 3C, additional to those of FIG. 4.
Figure 6:
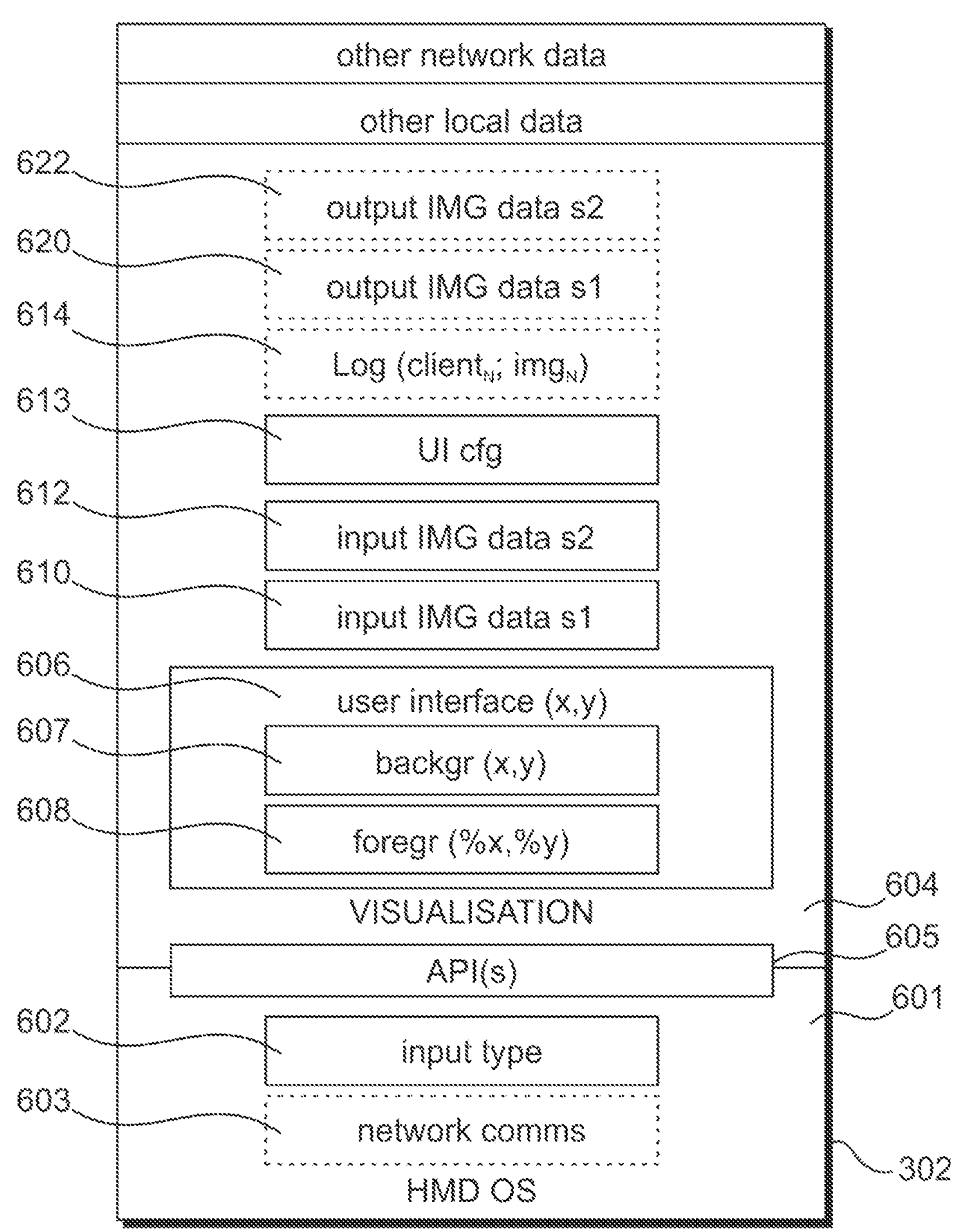
FIG. 6 illustrates the contents of the memory of FIGS. 3A to 3C at runtime when performing the steps of FIG. 4 and, in dotted lines, when performing the optional steps of FIGS. 5 and 12, including a user interface.

Basic and enhanced data processing configuration and functionality of a HMD 10 of FIGS. 1A to 3C is now described by reference to FIGS. 4 and 5, wherein data structures stored in the memory 302 and processed by the CPU 301 are shown in FIG. 6 and illustrated in a surgical use case in FIGS. 7A to 8B, and wherein like numerals reference like features.

An operating system 601 is initially loaded at step 401 when first powering the HMD, for governing basic data processing, interdependence and interoperability of HMD components 301 to 309, including the WNIC 310 when present. The HMD OS may be based on Android™ distributed by Google™ of Mountain View, California, United States. The OS includes input subroutines 602 for reading and processing input data variously consisting of user direct input to the physical interface device 304 and user indirect input consisting of one or more gestures captured optically by at least one optical sensor 30, 32 and interpreted by the OS as commands. In embodiments wherein the second optical sensor 32 comprises pan and tilt capacities, the OS 601 further includes pan and tilt course thresholds for the component pan/tilt mechanism. In embodiments of the HMD 10 including networking means 310, the OS 601 further includes communication subroutines 603 to configure the HMD 10 for bilateral network communication with remote terminals via the WNIC 310 interfacing with a network router device.

A set of instructions embodying a visualization application 604 is next loaded at step 402. The visualization application 604 is interfaced with the optical sensors 30, 32 and the physical input interface 304 through the OS 601 via one or more Application Programmer Interfaces (API) 605. The visualization application 604 comprises and coordinates data processing subroutines embodying the various functions described herein, including the updating and outputting of a user interface 606 to the displays 26A, 26B in real-time.

The first imagining sensor 30 is initialized at step 403, wherein its imager begins to capture the physical environment facing the HMD 10 in its respective line of sight, within the broad field of view 40, as first image data 610. In the example use case, shown in FIG. 7A, the physical environment is a surgical theater comprising a patient 70 resting on a medical bed 72, observable within the broad field of view 40 and undergoing surgery on their right hand 74, observable within the narrow field of view 42, wherein the captured first image data 610 shows the patient 70 on the medical bed 72.

The second imagining sensor 32 is also initialized at step 403, wherein its imager likewise begins to capture the same physical environment facing the HMD 10 in its respective line of sight, within the narrow field of view 42, as second image data 612. In the example use case, the patient right hand 74 is observable within and magnified by the narrow field of view 42, wherein the captured second image data 612 shows the hand 74 in close up.

The visualization application 604 may maintain a variety of further data sets processed by its subroutines, including a configuration file 613 for the user interface 606, loaded with the visualization application 604 at start up and according to which the UI 606 is next initialized and first instantiated at step 404. The user interface 606 of this example comprises background and foreground frames 607, 608 each independently assignable to the first or second image data 610, 612, for compositing frame-respective image data.

Each frame having a display resolution corresponding to the user interface display resolution, which itself corresponds to the screen display resolution of the display panels 26, 26B, thus 1920×1080 pixels in the case of the AR HMD 10A, alternatively 4896×2448 pixels in the case of the VR/MR HMD 10B. Every pixel constituting the background image frame 607 is configured for displaying the assigned first or second image data 610, 612. Only a subset of the pixels constituting the foreground image frame 608 is configured as a subset display area 708 in which to display the assigned first or second image data, wherein remaining pixels 710 have 'null' values conferring them full transparency. Pixels of the background image frame 607 accordingly remain visible to the user through the foreground frame portion 710 outside of the subset display area 708 when the background and foreground frames are composited together in the user interface 606.

Figures 7A, 7B, 7C, 7D:
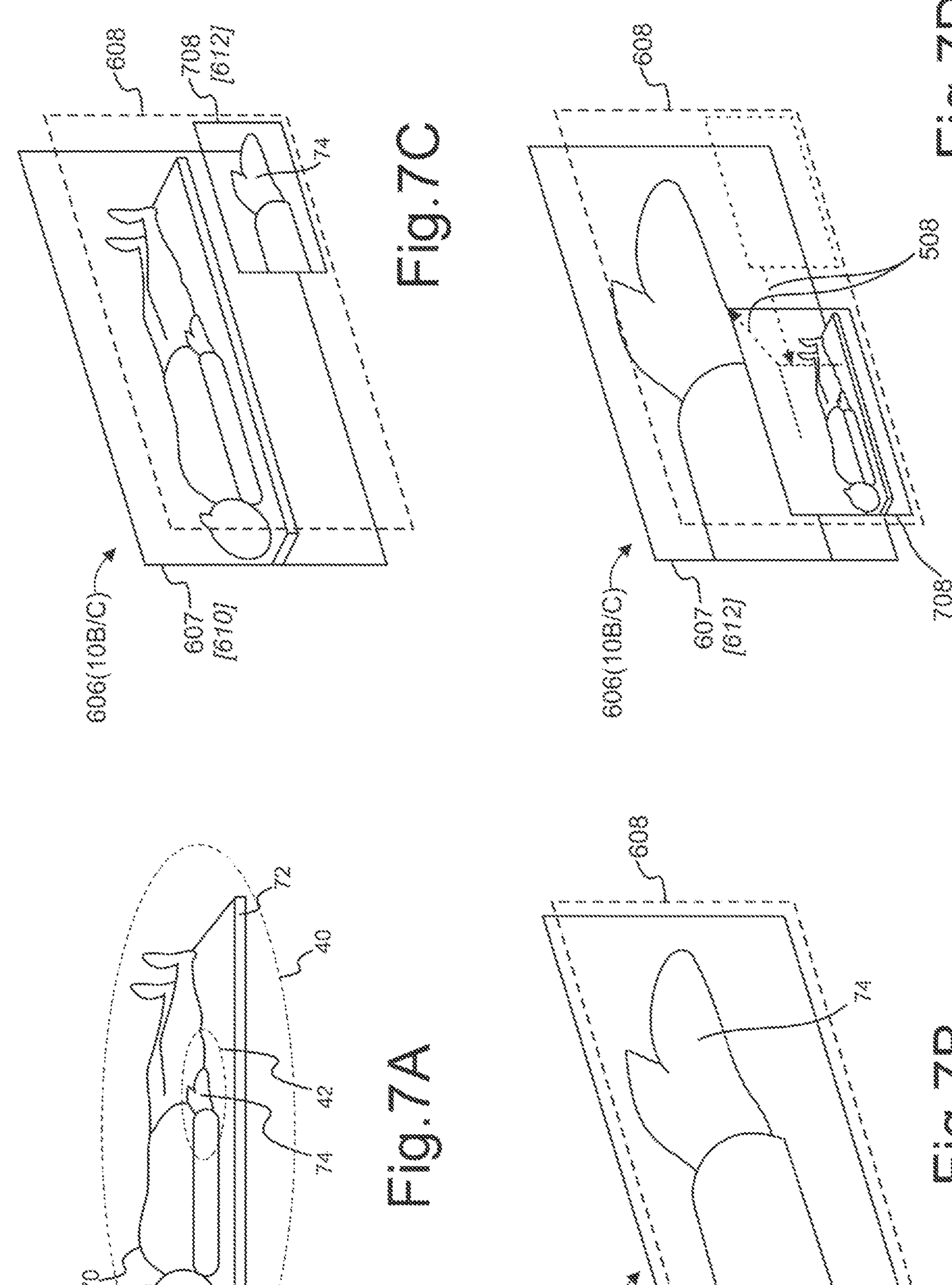
FIGS. 7A to 7D illustrate various states of the user interface of FIG. 6.
Figures 8A, 8B:
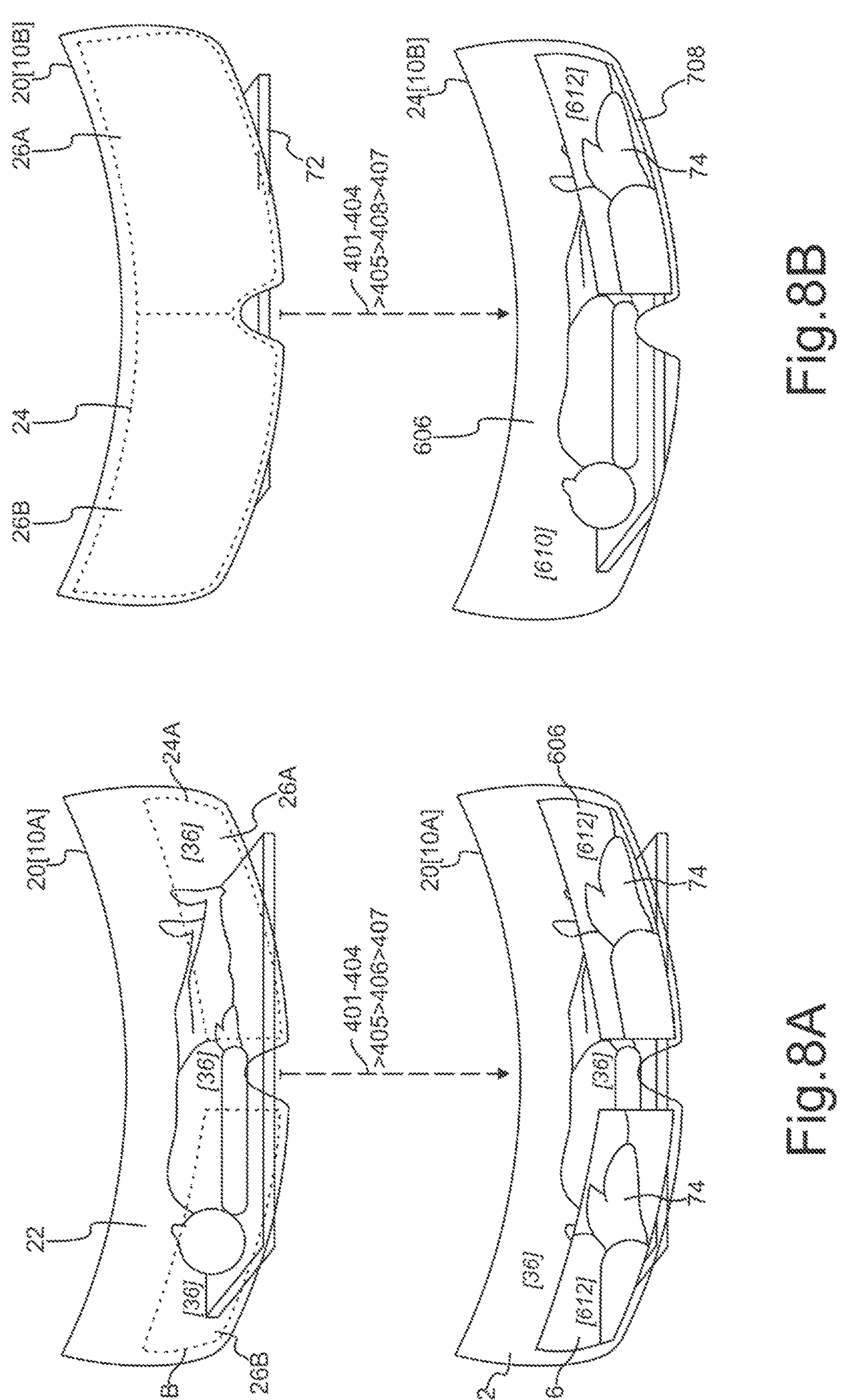
FIG. 8A illustrates nested fields of view of FIG. 2 in the user interface of FIGS. 6 and 7B, as displayed by an augmented reality ('AR') HMD as shown in FIG. 1A.
FIG. 8B illustrates nested fields of view of FIG. 2 in the user interface of FIGS. 6 and 7C, as displayed by a virtual or mixed reality ('VR/MR') HMD as shown in FIGS. 1B to 1D.

A question is next asked at step 405, about whether the HMD is an augmented reality HMD 10A, for example by reference to a HMD OS configuration record. The see-through portion 22 of the visor 20 in an AR HMD 10A negates the requirement to display the first image data representative of the physical environment in a broad field of view 40 at any given time for the wearer. Accordingly when the question of step 405 is answered positively, then at step 406 the second image data 612 imaging the physical environment within the narrow field of view 42 is assigned to the background frame 607, optionally scaled according to any difference of resolution between the captured image data 612 and the user interface 606, all pixels of the subset 708 in the foreground frame 608 are also assigned a null value such that the foreground frame does not contains any first or second image data, and the background and foreground frames are output simultaneously to the user interface, which is itself output to the HMD display at step 407. This sequence is illustrated in FIGS. 7A, 7B and 8A.

Alternatively, in the case of a VR/MR HMD 10B or 10C, the question of step 405 is answered negatively. The visor 20 for this HMD type has no see-through portion, as illustrated in FIG. 8B, thus the wearer may require sight of the first image data 610 at any given time for gaining an understanding of the ambient physical environment outside the closed HMD. Accordingly at step 408, the first image data 610 imaging the physical environment within the broad field of view 40 is assigned to the background frame 607 and optionally scaled according to any difference of resolution between the captured image data and the user interface, the second image data 612 imaging the physical environment within the narrow field of view 42 is assigned to the subset display area 708 of the foreground frame 608 and scaled according to the difference of resolution between the captured image data and the subset display area, and the background and foreground frames are output simultaneously to the user interface, which again is itself output to the HMD display at step 407. This sequence is illustrated in FIGS. 7A, 7C and 8B.

A question is next asked, about whether a command has been received to end operation of the HMD 10, for example a user activation of an on/off switch 304. So long as the question is answered negatively, the logic loops to the user interface outputting of step 407, whereby first and second image data captured by the respective optical sensors 30, 32 is continually output to the HMD display, substantially in realtime. Eventually the question is answered positively and the HMD ceases operation.

Skilled persons will readily understand however, that the description of assignable frames is by way of example only, and will readily envisage the configuration of the user interface with a single frame of pixels independently assignable to first or second image data instead, particularly if such a configuration reduces memory and computation requirements relative to frame compositing techniques.

Additional data processing steps may enhance the functionality and usability of the HMD for the wearer, such as manually selecting the assignment of first and second image data in the user interface and, in the case VR/MR HMDs 10B, editing the size and/or location properties of the subset display area in the user interface according to wearer preferences.

For example, with reference to FIG. 5 now, subsequently to the first outputting of the user interface to the HMD display at step 407, a question may then be asked at step 501, about whether a command has been received to select image data. When the question of step 501 is answered positively, a determination of whether the HMD is an AR HMD 10A or a VR/MR HMD 10B is made at step 502, for instance with a callback or reference to the initial AR HMD determination of step 405.

When the HMD is an AR HMD 10A, then at step 503 alternative image data is assigned to the background frame in replacement of the image data last assigned thereto and the background and foreground frames are output simultaneously to the user interface. Accordingly, a first instance of step 503 effectively substitutes the second image data initially assigned to the background frame at step 406, for the first image data whereby, on a next output of the user interface to the HMD display when the logic eventually returns to step 407, the user interface displays the first image data instead of the second.

When the HMD is a VR/MR HMD 10B instead, then at step 504 alternative image data is assigned to each of the background and the foreground frames in replacement of the image data last assigned to each respectively, and again the background and foreground frames are output simultaneously to the user interface. Accordingly, a first instance of step 504 effectively inverts the initial assignment of the first and second image data to the background and foreground image frames respectively at step 408, as illustrated in FIG. 7D.

Wearers of VR/MR HMDs 10B may wish to dispense with the secondary image data of the foreground frame, wherein a question is then asked at step 505, about whether a further user input has been received, indicative of a secondary image selection. If the question of 505 is answered positively, then at step 506 all pixels of the subset in the foreground frame are also assigned a null value such that the foreground frame does not contains any first or second image data, and again the background and foreground frames are output simultaneously to the user interface. Alternatively, no secondary image selection is performed whereby, on a next output of the user interface to the HMD display when the logic eventually returns to step 407, the user interface displays the alternative image data in the background and foreground frames per step 504.

Subsequently to step 503, to question 505 being answered negatively or to step 506, likewise in the absence of an image data selection command whereby the question of step 501 is answered negatively, a question is asked at step 507, about whether a command has been received to edit the user input settings. When the question of step 507 is answered positively, then at step 508 user input is read and used to scale up or down, alternatively or additionally to displace, the subset display area of the foreground frame relative to its last configuration, the updated values of size and screen position of the subset display area are stored and again the background and foreground frames are output simultaneously to the user interface, all substantially in realtime wherein the HMD wearer gets immediate visual feedback on their user interface editing. The logic then returns to querying whether a command has been received to end operation of the HMD 10, likewise when the question of step 507 is answered negatively.

In a use case example shown in FIG. 7D, as the user interface of the example occupies 100% of the video display capacity of a VR or MR headset 10B, a surgeon wearer may select the second image data 612, more focused than the first, for display at steps 504, 506, in order to maximize their observational capacity of the surgery site on a patient. The surgeon wearer may also, or eventually, select the first image data 610 for combined display with the second image data at step 504 in a subsequent loop of the logic, in order to help maintain their situation awareness of support personnel in the operating theatre, e.g. when interacting physically with such persons when taking or passing back tools, utensils and the like, as surgery progresses. The first image data is accordingly composited with the second image data, i.e. assigned to the subset display area of the foreground frame, and e.g. according to a default setting of a downscaled but image ratio-preserving instantiation equivalent to 30% of the total user interface area by default. Thus 70% of the second image data assigned to the background frame remains visible to the wearer in use. The surgeon user may then reduce the ratio of user interface dedicated to the subset display area to 15% of the entire user interface, deemed still sufficient for observing adjacent personnel as and when required, wherein 85% of the second image data remains visible to the user in use, outside of the further-downscaled first image data instantiation.

Still more data processing steps may enhance the functionality and usability of the HMD for the wearer, such as selecting, when available, alternative image data to the first image data 610, for example from the additional near-infrared light sensor 35 of the third HMD embodiment 10C. In the case of the AR HMD 10A, the fluorescence image data output by the further sensor 35 may be selected by the wearer for assignment to one 24A of the two display portions of the user interface 606, whilst maintaining the more focused second image data 612 in the second display portion 24B of the user interface 606. The above-described steps may be added as an additional subroutine of the image-selecting input sequence 501 to 506, or as an additional subroutine intermediate steps 506 and 507, and the fluorescence image data may be moved and/or scaled in the user interface 606 of a VR/MR HMD 10B-10D according to steps 507 and 508 as described herein.

In embodiments of the HMD 10 including networking means 310, used in a system described hereinafter, the visualization application 604 further maintains a log file 614 of any remote terminal currently network-connected with the HMD 10, each such terminal recorded in the log file with data representative of the captured first and/or second image data 610, 612 respectively distributed to it, independently of the user interface configuration file 613. The captured first and/or second image data 610, 612 distributed to the one or more remote terminals is shown as image streams 620 and 622 respectively.

Further local data and network data is also shown, which may be stored in the memory means 302 at runtime, and some or all of which may be processed either by the visualization application 604 and sub-routines thereof, or by or for other application(s) or the OS 601 being processed in parallel with the visualization application 604 at runtime.

Figure 9:
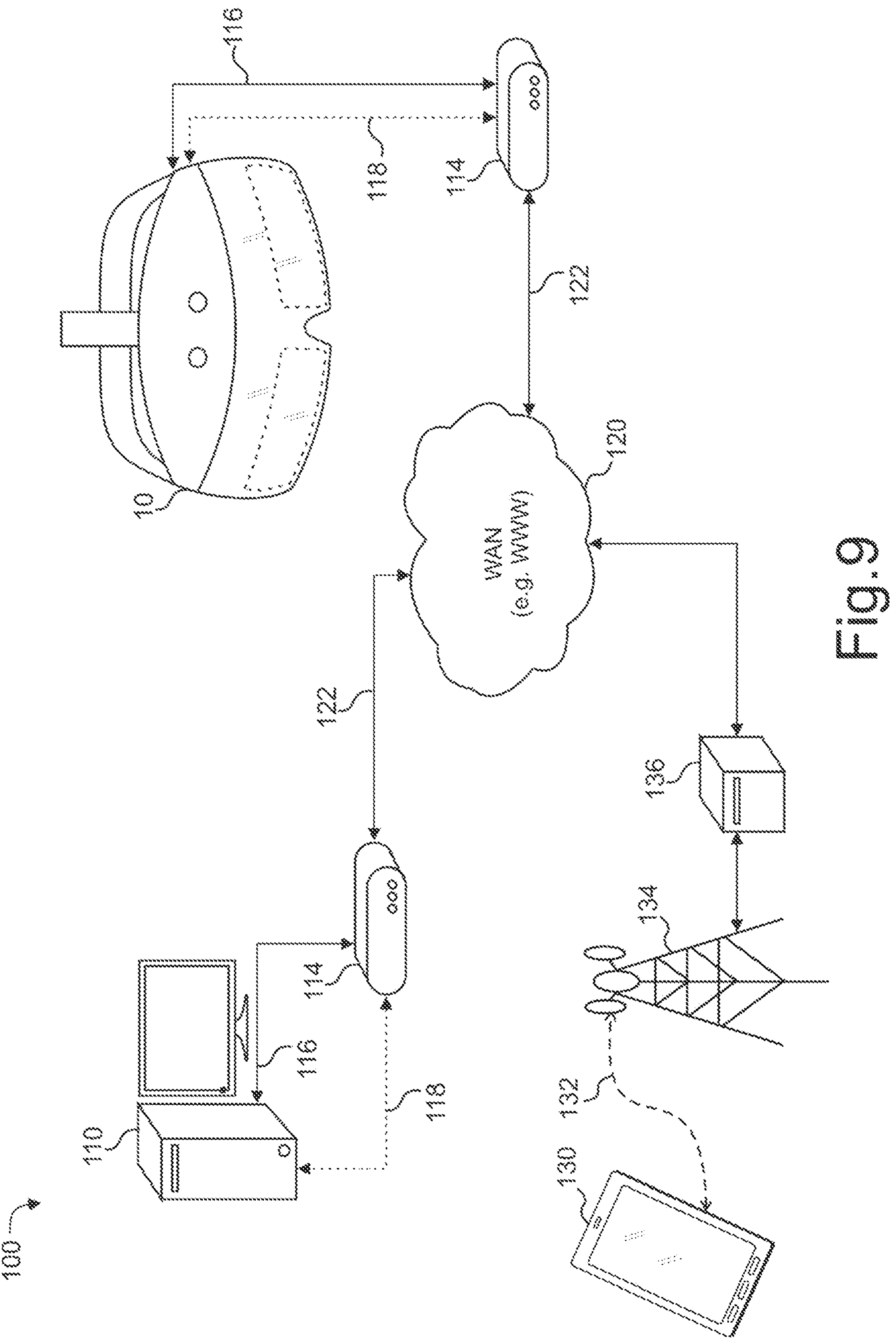
FIG. 9 shows an embodiment of a bifocal distributed imaging system according to the invention, including a network, at least one HMD of any of FIGS. 1A to 1D and remote terminals.

With reference to FIGS. 9 to 13 now, the inventive concept also extends to a bifocal distributed imaging system 100, an embodiment of which is illustrated in FIG. 9. Any embodiment of the system comprises at least one HMD device 10 and at least one remote terminal 110 with a display and in bilateral data communication with the HMD 10 over a network 120, wherein the embodiment of the visualization application 604 further configures the CPU 301 to distribute the captured first and/or second image data 610, 612 to the remote terminal 110.

In the example shown, a first remote data processing terminal 110 is a desktop computer, or a portable variant such as a laptop or tablet computer, which emits and receives data encoded as digital signals over wired and/or wireless data transmissions 112 that are routed by a local router device 114 implementing a wired local network 116 operating according to the IEEE 802.3-2008 Gigabit Ethernet transmission protocol and/or a high-bandwidth wireless local network 118 operating according to the IEEE 802.11 Wi-Fi wireless transmission protocol. The local router device 114 is itself connected to a wide area network ('WAN') 120, an example of which is the Internet, via a conventional ADSL or optical fibre connection 122.

Remote data processing terminals may also include personal communication devices, e.g. a smartphone 130 shown as a second remote data processing terminal in FIG. 9, which broadcasts and receives data, including voice and/or alphanumerical data, encoded as a digital signal over a wireless data transmission 132, wherein the signal is relayed respectively to or from the or each personal communication device 130 by the geographically-closest communication link relay 134 of a plurality thereof. A plurality of such communication link relays $\mathbf{134}_{1-N}$ allows digital signals to be routed between the or each mobile device $\mathbf{130}_{1-N}$ and its respective counterpart, in the example the HMD 10, by means of a remote gateway 136. Gateway 136 is for instance a communication network switch, which couples digital signal traffic between wireless telecommunication networks, such as the network within which wireless data transmissions 132 take place, and the WAN 120.

Figure 10:
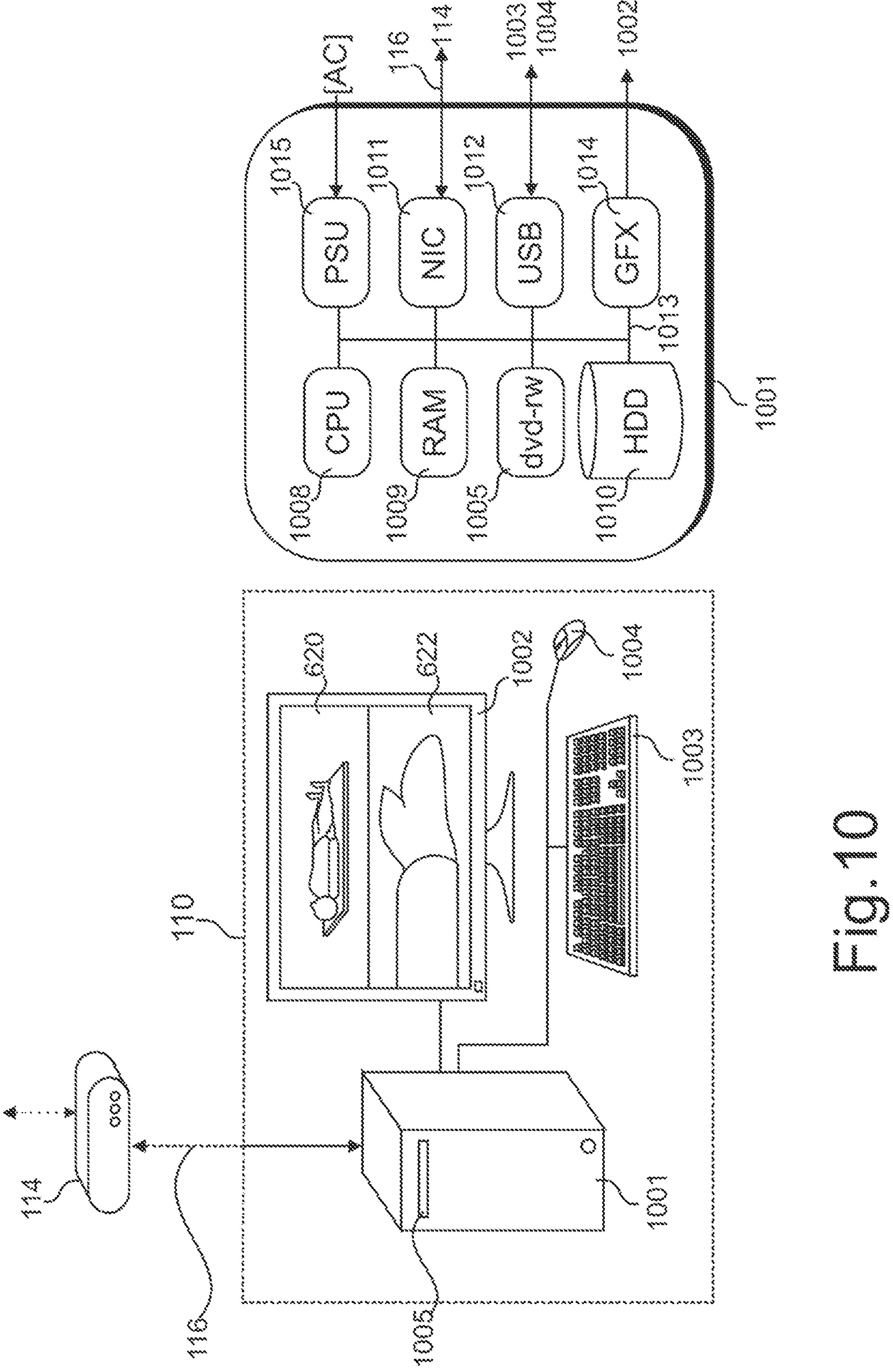
FIG. 10 is an example hardware architecture for a remote terminal shown in FIG. 9, including a memory.

A typical hardware architecture of the remote data processing terminal 110 is shown in FIG. 10 in further detail, by way of non-limitative example. The computer is configured with a data processing unit 1001, data outputting means such as video display unit (VDU) 1002, data inputting means such as HID devices, commonly a keyboard 1003 and a pointing device (mouse) 1004, as well as the VDU 1002 itself if it is a touch screen display, and data inputting/outputting means such as the wired or wireless network connection 116 to local and wide area networks via the router 114, and optionally a magnetic or optical data-carrying medium reader/writer 1005.

Within the data processing unit 1001, a central processing unit (CPU) 1008 provides task co-ordination and data processing functionality. Sets of instructions and data for the CPU 1008 are stored in memory means 1009 and a hard disk storage unit 1010 facilitates non-volatile storage of the instructions and the data. A wired and/or wireless network interface card (NIC) 1011 provides the interface to the network connection 116 with the router 114. One or more universal serial bus (USB) input/output interfaces 1012 facilitate connection to the keyboard and pointing devices 1003, 1004.

All of the above components are connected to a data input/output bus 1013, to which the magnetic or optical data-carrying medium reader/writer 1005 is also connected. A video adapter 1014 receives CPU instructions over the bus 1013 for outputting processed video data to the VDU 1002. All the components of data processing unit 1001 are powered by a power supply unit 1015, which receives electrical power from a local mains power source and transforms same according to component ratings and requirements.

The networked environment of the example is deliberately small, to avoid obscuring the present description unnecessarily, and the skilled person will easily understand from the foregoing, how a system according to the invention may scale up the operating principles described herein to many more HMDs 10 and remote terminals of varying types 110, 130 and network connectivity, subject to relevant and suitable interoperability protocols.

Figure 11:
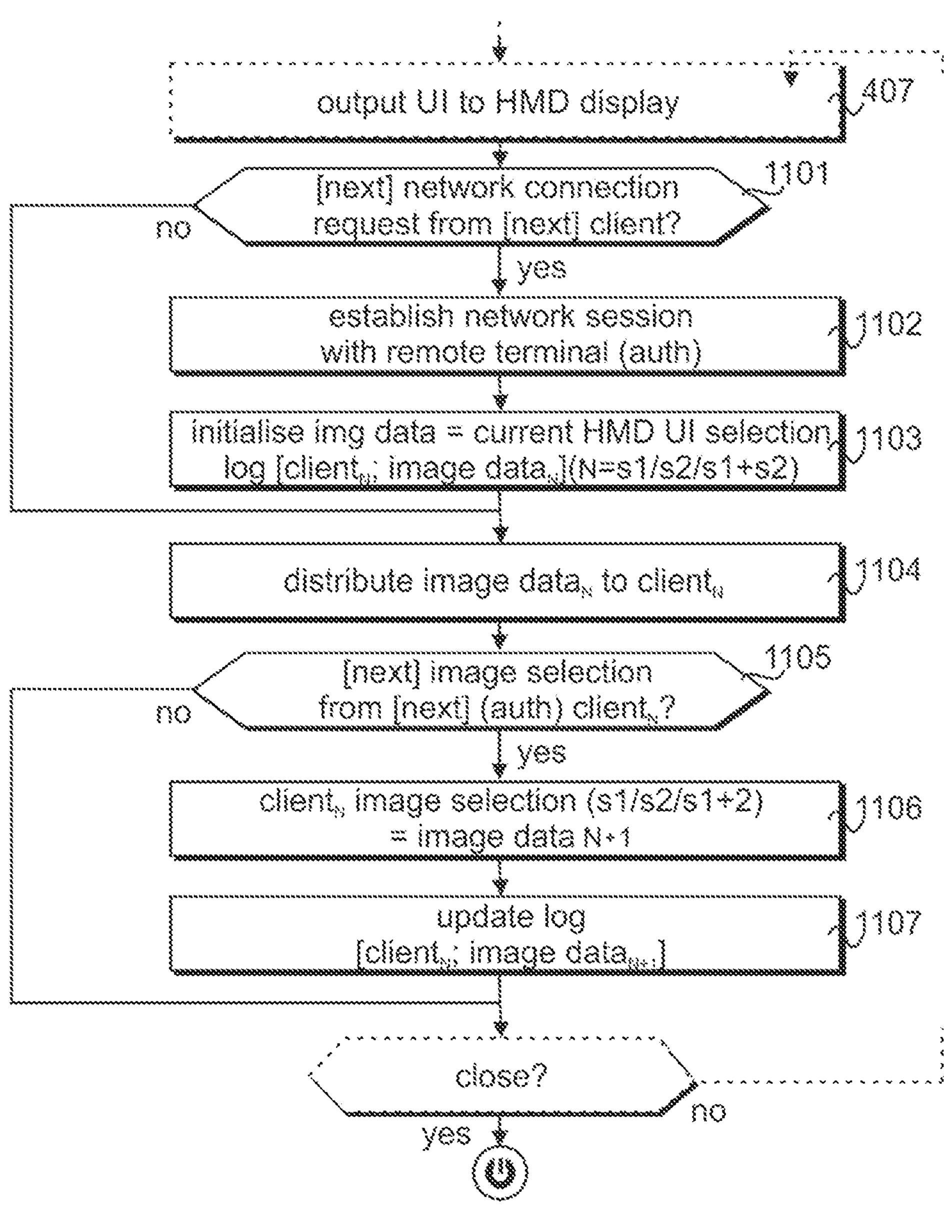
FIG. 11 details data processing steps performed by the architecture of any of FIGS. 3A to 3C, additional to those of FIGS. 4 and/or 5, in the system of FIG. 9.

Within the context of the system shown in and described with reference to FIGS. 9 and 10, the methodology of the image data network distribution according to invention is implemented as data processing logic performed jointly and respectively at the or each HMD 10 and at each remote terminal 110, 130. With reference to FIG. 11 now, at each HMD, subsequently to the first outputting of the user interface to the HMD display at step 407 and irrespectively of whether the visualization application 604 implements user image selection and/or user interface reconfiguration or not, a question is initially asked at step 1101, about whether a network connection request has been received from a remote terminal 110, 130.

When the question of step 1101 is answered positively, an authentication module or subroutine of the visualization application 604 authenticates access for the requesting terminal at step 1102, based on terminal user credentials or some other authorization technique, preferably multifactorial. On a successful authentication, the visualization application 604 records data in the log file 614 representative of the authenticated remote terminal, for instance a unique network address and/or hardware identifier of terminal, and a data network connection gets established between the HMD 10 and the requesting terminal across the network 120.

At a next step 1103, an image distribution module or subroutine of the visualization application 604 initializes the respective image data to be distributed to the authenticated remote terminal as an output data structure, for instance an output video stream, in the example first network image data 620 corresponding to the first image data 610 captured locally with the first optical sensor 30 and second network image data 622 corresponding to the second image data 622 captured locally with the second optical sensor 32. At initial connection, the respective image data to be distributed is set to correspond to the image data 610 and/or 612 currently output to the HMD user interface 606, and the visualization application 604 records data in the log file 614 representative of the respective image data against the respective terminal record.

Subsequently to step 1103, or when the question of step 1101 is answered negatively, the visualization application 604 proceeds to distribute the first and/or second network image data 620, 622 to the or each remote terminal connected thereto according to the log file 614 at step 1104.

A question is asked next at step 1105, about whether a network request encoding an image data selection has been received from a connected terminal, wherein the remote selection is, logically, the first or second image data or a combination of the first and second image data and, logically still, different from the currently-distributed image data. When the question of step 1105 is answered positively, the image distribution module or subroutine of the visualization application 604 decodes the remote selection and determines the next image data 620, 622, 620-622 to be distributed according to same at step 1106, then records data in the log file 614 representative of the updated respective image data against the respective record of the requesting terminal at step 1107.

The logic then proceeds to querying whether a command has been received to end operation of the HMD 10, likewise when the question of step 1105 is answered negatively whereby, on a next iteration of the image distributing step 1104, a remote terminal 110 that has effected an image data selection then begins to receive the selected, alternative image data, and so on and so forth.

Figure 12:
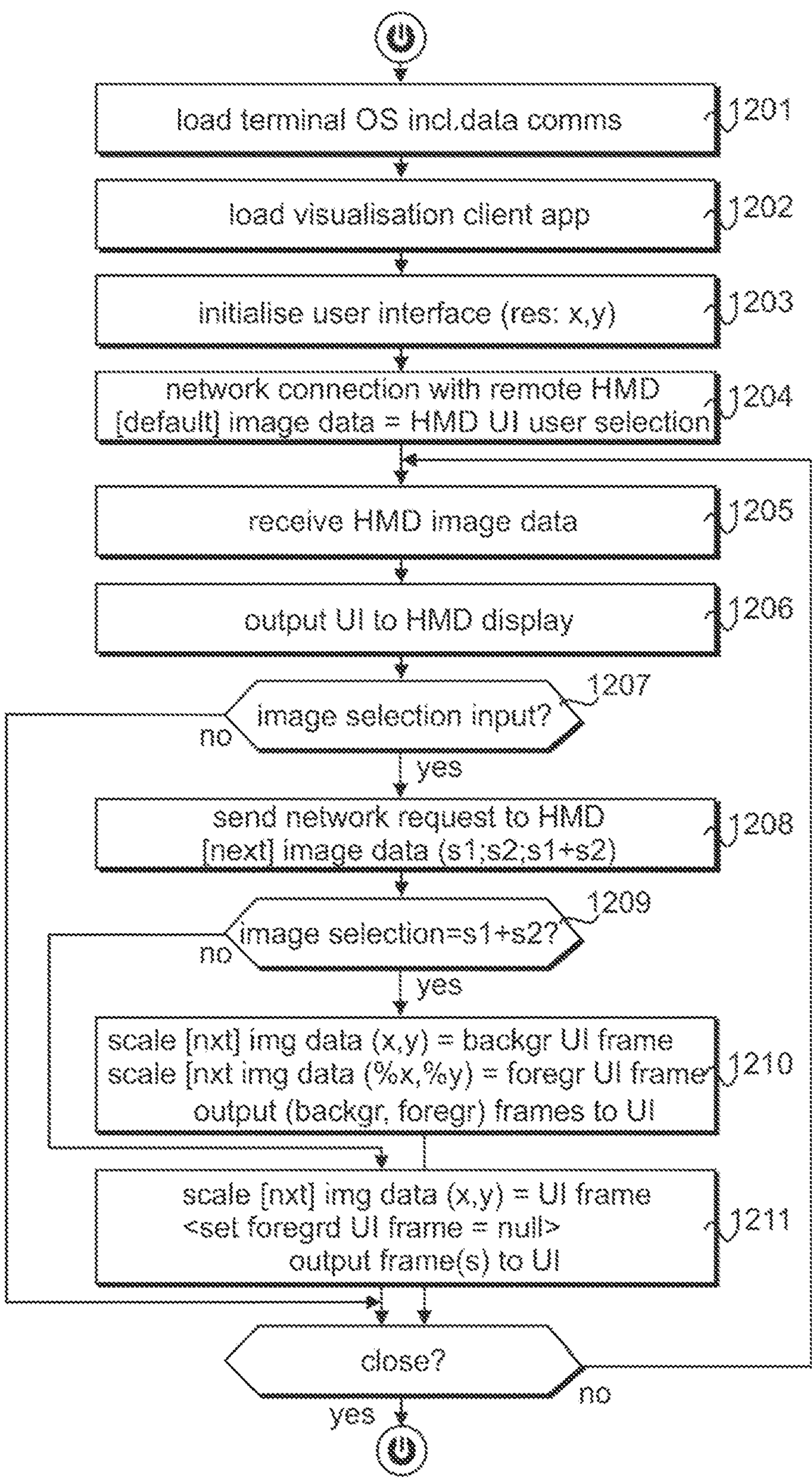
FIG. 12 details data processing steps performed by the architecture of FIG. 10 in the system of FIG. 9.
Figure 13:
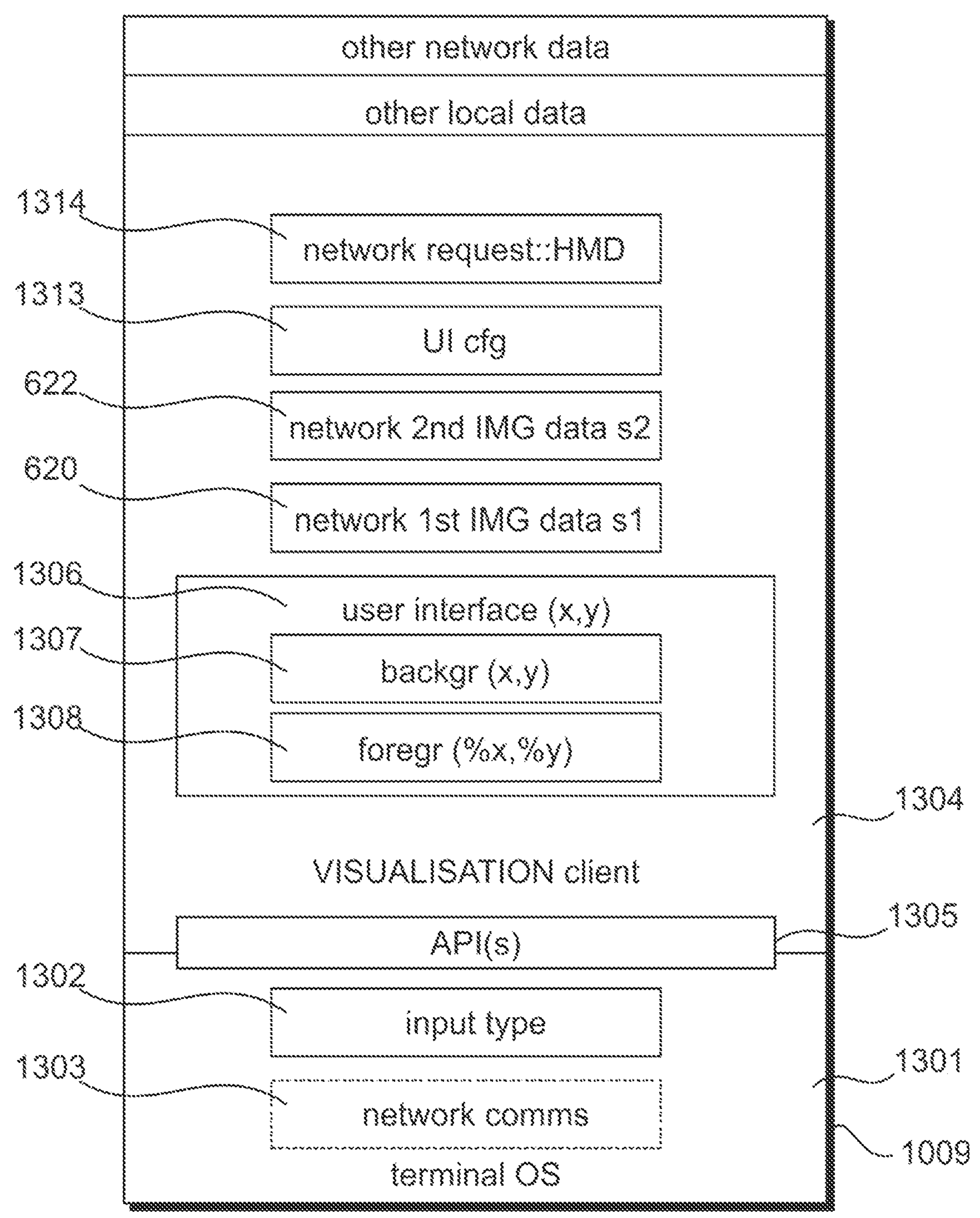
FIG. 13 illustrates the contents of the memory of FIG. 10 when performing the steps of at least FIG. 12 at runtime.

In parallel with steps 1101 to 1108 at the HMD 10, and now with reference to FIGS. 12 and 13, at each remote terminal, an operating system 1301 is initially loaded at step 1201 when first powering the terminal, for governing basic data processing, interdependence and interoperability of components 1001 to 1014. The terminal OS may be Windows 11™ distributed by Microsoft™ of Redmond, Washington, United States. The OS includes input subroutines 1302 for reading and processing input data variously consisting of user direct input to the physical interface devices 1003, 1004 and optionally 1002, and communication subroutines 1303 to configure the terminal for bilateral network communication with remote HMD(s) 10 via the (W)NIC 1011 interfacing with the network router device 114.

A set of instructions embodying a visualization client application 1304 is next loaded at step 1202. The visualization application 1304 is interfaced with the input and network subroutines 1302, 1303 and remote data nodes via one or more Application Programmer Interfaces (API) 1305. The visualization client application 1304 comprises and coordinates data processing subroutines embodying the various functions described herein, including the updating and outputting of a user interface 1306 to the display 1002 in real-time.

The visualization client application 1304 maintains a variety of data sets processed by its subroutines, including a user interface 1306 and a configuration file 1313 for same, loaded with the visualization client application 1304 at start up and according to which the UI 1306 is next initialized and first instantiated at step 1203. At step 1204, the visualization client application 1304 requests and establishes a bilateral data connection with the HMD 10 across the network 120, with authenticating access that is logged at the HMD in the log file 614 at step 1102.

As previously described, the default image data assigned to the connecting terminal 110 at login and similarly logged at the HMD in log file 614 at step 1102, is the first and/or second image data 610, 612 output to the HMD user interface 606 at the time of authenticating network access. That first and/or second image data 610, 612 is accordingly distributed by the HMD 10 as first and/or second network image data 620, 622 and eventually received by the terminal 110 at step 1205, whereby it is suitably scaled for and output to the user interface 1306 on the display 1002 at step 1206, all substantially in realtime as the first and second image data 610, 612 continues to get captured by the first and second optical sensors 30, 32 remotely at the HMD 10, subject to any data processing and networking latency inherent to the HMD, the terminal and the network connection therebetween.

A question is then asked at step 1207 about whether the user of terminal 110 has input a local command, for instance with HiD device 1003 or 1004, to select next image data amongst the plurality of optical sensor-respective image data sets available from the remote HMD. For example, when the remote HMD 10 is an AR HMD 10A, having the second image data 612 output by default to its own user interface 606, the image data distributed to the terminal user 110 and output in the user interface 1306 pursuant to the first instance of step 1206 is the corresponding second network image data 622, wherein the terminal user may select either the first image data 610, or a combination of the first and second image data 610, 612 as next image data. Thus, when the question of step 1207 is answered positively, the visualisation client application 1304 sends a network request to the remote HMD 10 at step 1208, encoding the next image data selection.

A further question is then asked at step 1209, about whether the user-selected image data comprises both the first and the second image data 610, 612. When the question of step 1209 is answered positively, then at step 1210. the first network image data 620 is assigned to a first portion of the user interface 1306 (alternatively to a background frame 1307 thereof) and the second network image data 622 is assigned to a second portion of the user interface 1306 (alternatively to a subset display area 708 of a foreground frame 1308 thereof), each network image data set optionally and suitably scaled according to any difference of resolution between the network image data resolution and the user interface portion assigned same, and output simultaneously to the user interface 1306.

Alternatively, the question of step 1209 is answered negatively whereby, at step 1211, the alternative network image data (620, 622) is assigned to the user interface 1306 (alternatively to a background frame thereof, with a foreground frame thereof set to full transparency) in replacement of the currently-assigned network image data (622, 620), is optionally and suitably scaled according to any difference of resolution between the network image data resolution and the user interface resolution, and output to the user interface 1306.

After step 1210 or 1211, or whenever the question of step 1207 is answered negatively, a question is next asked, about whether a command has been received to end the processing of the visualization client application 1304. So long as that question is answered negatively, the logic loops to the HMD image data receiving of step 1205 followed by the user interface outputting of step 1206, wherein first and/or second image data 610, 612 captured remotely by the respective optical sensors 30, 32 at the HMD is continually distributed and output to the UI 1306 on the terminal display 1002, according to the last user interaction of steps 1207 to 1211. Eventually the question is answered positively and the visualization client application 1304 and its data structures are unloaded from the terminal memory 1009.

As with the HMD user interface 606, the user interface 1306 at the terminal may be user-reconfigured in realtime substantially as described with reference to steps 505 to 508, wherein user selection(s) are input via HiD devices 1003, 1004 for updating the assignment of first or second image data respectively to first and second portions of the UI 1306 (alternatively to background 1307 and/or foreground frames 1308 thereof) and/or for updating the respective sizes and/or locations of the first and/or second portions of the UI (alternatively of a subset display area 708 of a foreground frame 1308 thereof), and are stored into the UI configuration file 1313, all independently of the remote HMD 10.

When the second image sensor 32 of the networked HMD 10 is actuatable, for instance with pan and tilt capacities, the bifocal distributed imaging system described with reference to FIGS. 9 to 13 may be further enhanced by allowing a remote observer at a client terminal 110, 130 to shift the narrower second FoV 42 within the larger ambient FoV 40 at the HMD over the network, substantially in realtime.

Figures 14A, 14B:
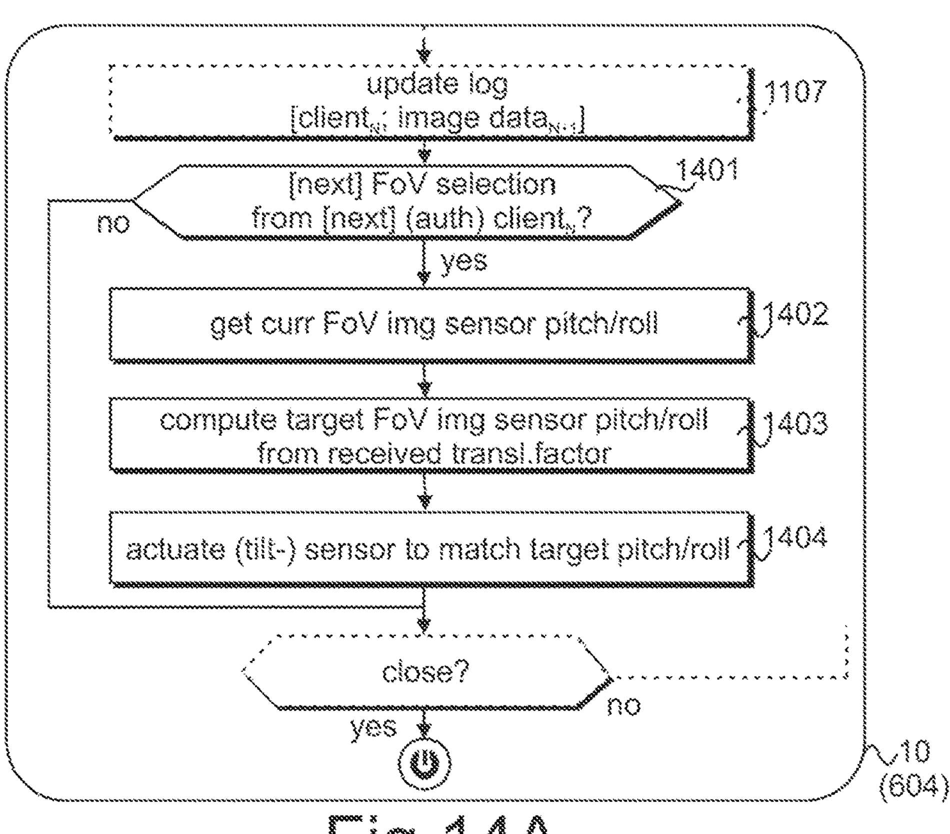
FIG. 14A details data processing steps optionally performed by the architecture of any of FIGS. 3A to 3C, additional to those of FIG. 11.
FIG. 14B details data processing steps optionally performed by architecture of FIG. 10, additional to those of FIG. 12.

This enhanced functionality is now described with reference to FIGS. 14A and 14B as additional data processing logic performed jointly and respectively by the visualisation application 604 of the networked HMD 10 intermediate log updating step 1107 and the application closure end check, and the visualisation client application 1304 of a remote terminal 110, 130 intermediate UI outputting step 1211 and the application closure end check. The respective pan and tilt courses of the second image sensor 32 are constrained to the second focused FoV 42 within the first ambient FoV 40 irrespective of user commands, both in the HMD firmware or operating system 601 and as threshold parameters of the visualisation client application 1304.

At the networked HMD 10, subsequently to the log updating of step 1107, a question is asked at step 1401 about whether a FoV selection has been received from a remote terminal 110, 130, for example data representative of a translation vector, captured from user input to the HiD device 1004 for translating the visible subset display area 708 relative to the foreground frame 1308 in the user interface 1306, which is indicative of a command to shift the focus of the second FoV 42, through corresponding pan and/or tilt commands of the second image sensor 32, from a current position to a desired next position. When the question of step 1401 is answered positively, at step 1402 the visualization application 604 obtains the current pan and tilt values of the sensor, relative to normalized pan and tilt values of same at HMD initialization, as a sensor attitude datum.

At step 1403, the HMD visualization application computes target pan and/or tilt values for the second image sensor 32 according to the translation vector data. At step 1404, the HMD visualization application commands (pans and/or tilts further) the second image sensor 32 according to the computed target values, whereby the second FoV 42 shifts to the remote user's input data. The logic then resumes querying, whether a command has been received to end operation of the HMD 10, likewise when the question of step 1401 is answered negatively, and so on and so forth.

In parallel with steps 1401 to 1403 at the HMD 10, a question is asked at step 1411 at each terminal 110, 130 subsequently to the outputting of image data to the UI 1306 of step 1211, about whether the terminal user is effecting a field of view translation in the user interface, which for example begins with a selection of the visible subset display area 708 with a command or interrupt of the HiD device 1004. When the question of step 1411 is answered positively, at step 1412 the client visualization application 1304 obtains the current coordinates of opposite corners of the subset display area 708 within the bi-dimensional coordinate system (x,y) of either the display 1002 or the user interface 1306 thereon.

As the user imparts a translation motion to the HiD device 1004 so long as the visible subset display area 708 remains selected, e,g. by maintaining mouse button clicked, then on any interruption of the motion at step 1413, the client visualization application computes the translation vector between the position of the subset display area 708 initialized at previous step 1412 and the current position of the HiD device 1004 as read. At step 1414, the client visualization application communicates the computed translation vector data to the remote HMD 10 across the network, whereat it shall be processed according to steps 1401-1404. The logic then resumes querying, whether a command has been received to end operation of the client visualization application, likewise when the question of step 1411 is answered negatively, and so on and so forth.

In the specification the terms "comprise, comprises, comprised and comprising" or any variation thereof and the terms include, includes, included and including" or any variation thereof are considered to be totally interchangeable and they should all be afforded the widest possible interpretation and vice versa. The invention is not limited to the embodiments hereinbefore described but may be varied in both construction and detail.

The invention claimed is:

1. A head mounted display (HMD) device comprising at least first and second imaging sensors, wherein the at least first imaging sensor is configured with a first focal value defining a first field of view for capturing first image data in realtime, wherein the at least second imaging sensor is configured with a second focal value defining a second field of view, for capturing second image data in realtime, and wherein the first and second focal values are different and wherein the second field of view is contained within the first field of view;

display means;

data processing means operably connected to the display means and to the first and second imaging sensors, configured to output a user interface on the display means and to output the simultaneously captured first image data and second image data in the user interface;

data networking means, wherein the data processing means is further configured to selectively distribute the captured first and/or second image data to at least one remote terminal with the data networking means.

2. The HMD according to claim 1, wherein the first field of view is substantially 65 degrees or more and/or wherein the second field of view is substantially 40 degrees or less.

3. The HMD according to claim 1, wherein the data processing means is further configured to selectively output the captured first and/or second image data in the user interface according to a user selection.

4. The HMD according to claim 1 wherein, when the data processing means is further configured to output the captured first and second image data in the user interface and to composite the captured first image data with the simultaneously captured second image data.

5. The HMD according to claim 4, wherein the data processing means is further configured to adjust a ratio of the captured first image data to the simultaneously captured second image data in the user interface.

6. The HMD according to claim 1, wherein the data processing means is further configured to receive remote selections and to selectively distribute the captured first and/or second image data according to a respective user selection at the at least one remote terminal.

7. The HMD according to claim 1, wherein the at least second imaging sensor is actuatable and the data processing means is further configured to translate the second field of view within the first field of view in use.

8. The HMD according to claim 1, wherein at least one of the at least first and second imaging sensors is configured to capture visible light in the wavelength range 400 to 700 nm.

9. The HMD according to claim 1, further comprising an image processing module operably connected to the at least second imaging sensor and the data processing means, wherein the at least second imaging sensor is configured with the second focal value by programming the image processing module to simultaneously receive first image data from the first imaging sensor and second image data from the second imaging sensor, and crop the second image data to an image portion representative of the second field of view.

10. A bifocal distributed imaging system, comprising at least one head mounted display (HMD) device comprising at least first and second imaging sensors, wherein the at least first imaging sensor is configured with a first focal value defining a first field of view for capturing first image data in realtime, wherein the at least second imaging sensor is configured with a second focal value defining a second field of view, for capturing second image data in realtime, and wherein the first and second focal values are different and wherein the second field of view is contained within the first field of view;

display means, data processing means and data networking means operable to interface the HMD device with a network, wherein the data processing means is configured to output the simultaneously captured first image data and second image data to a first user interface displayed on the display means and to distribute the simultaneously captured image data to at least one remote terminal across the network;

and one or more remote terminal addressable by the data networking means across the network, each having a display and configured to output the distributed image data to a second user interface displayed on the display thereof.

11. The system according to claim 10, wherein the data processing means is further configured to receive a local user input, representative of a local selection of the captured first and/or second image data, and to selectively output the captured first and/or second image data in the first user interface according to the selection.

12. The system according to claim 11 wherein, the data processing means is further configured to composite the captured first image data with the simultaneously captured second image data in the first user interface, when local user input is representative of a selection of the captured first and second image data; and/or the remote terminal is further configured to composite the captured first image data with the simultaneously captured second image data in the second user interface, when remote user input is representative of a selection of the simultaneously captured first and second image data.

13. The system according to claim 12, wherein the data processing means is further configured to adjust a ratio of the captured first image data to the simultaneously captured second image data in the user interface.

14. The system according to claim 10, wherein the data processing means is further configured to receive a remote user input, representative of a selection of the captured first and/or second image data at the at least one remote terminal, and to selectively distribute the captured first and/or second image data according to the remote selection, independently of the captured image data output to the first user interface at the HMD device.

15. A method of distributing image data in a network, comprising the steps of providing at least one head mounted display (HMD) device comprising display means, data processing means, data networking means, at least first and second imaging sensors;

wherein the first sensor has a first focal value defining a first field of view and the second sensor has a second focal value defining a second field of view, wherein the first and second focal values are different and wherein the second field of view is contained within the first field of view;

interfacing the at least one HMD device with at least one remote data processing terminal across a network with the data networking means;

simultaneously capturing first image data with the first imaging sensor and second image data with the second imaging sensor in realtime;

outputting the simultaneously captured first image data and second image data to a first user interface displayed on the display means;

distributing the captured first and/or second image data to the at least one remote terminal; and outputting the distributed image data to a second user interface displayed on a display of the at least one remote terminal.

16. The method according to claim 15, comprising the further steps of receiving a local user input at the HMD device, representative of a local selection of the captured first and/or second image data; and outputting the simultaneously captured first and/or second image data in the first user interface according to the selection.

17. The method according to claim 16, comprising the further step of compositing the captured first image data with the captured second image data, when the user selection is for outputting simultaneously captured first and second image data in the first user interface.

18. The method according to claim 17, comprising the further step of adjusting a ratio of the captured first image data to the simultaneously captured second image data in the first or the second user interface, one independently of the other.

19. The method according to claim 15, comprising the further step of receiving a remote user input at the HMD device, representative of a remote selection of the captured first and/or second image data;

wherein the step of distributing further comprises distributing the captured first and/or second image data according to the remote selection, independently of the captured image data output to the first user interface at the HMD device.

* * * * *